(12) United States Patent
Saneto et al.

(10) Patent No.: US 10,156,754 B2
(45) Date of Patent: Dec. 18, 2018

(54) LIQUID-CRYSTAL DISPLAY DEVICE

(71) Applicant: FUJIFILM Corporation, Tokyo (JP)

(72) Inventors: Ryuji Saneto, Kanagawa (JP);
Katsufumi Ohmuro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 325 days.

(21) Appl. No.: 15/001,662

(22) Filed: Jan. 20, 2016

(65) Prior Publication Data
US 2016/0147101 A1 May 26, 2016

Related U.S. Application Data

(63) Continuation of application No. PCT/JP2014/069310, filed on Jul. 22, 2014.

(30) Foreign Application Priority Data

Jul. 22, 2013 (JP) .................................. 2013-152055
Jul. 17, 2014 (JP) .................................. 2014-146852

(51) Int. Cl.
*G02F 1/1335* (2006.01)
*G02F 1/13363* (2006.01)

(52) U.S. Cl.
CPC ...... *G02F 1/13362* (2013.01); *G02F 1/13363* (2013.01); *G02F 1/133528* (2013.01);
(Continued)

(58) Field of Classification Search
CPC ............. H01L 27/3244; H01L 27/3211; H01L 27/322; H01L 51/5281; H01L 51/5293;
(Continued)

(56) References Cited

U.S. PATENT DOCUMENTS

| | | | |
|---|---|---|---|
| 9,110,203 B2 | 8/2015 | Seo et al. | |
| 2011/0037736 A1* | 2/2011 | Epstein | G02B 5/021 345/204 |

(Continued)

FOREIGN PATENT DOCUMENTS

| | | |
|---|---|---|
| CN | 101042496 A | 9/2007 |
| CN | 101806414 A | 8/2010 |

(Continued)

OTHER PUBLICATIONS

Notification of Reasons for Refusal issued by the Japanese Patent Office dated Aug. 2, 2016, in connection with Japanese Patent Application No. 2014-146852.
(Continued)

*Primary Examiner* — Thoi Duong
(74) *Attorney, Agent, or Firm* — Edwards Neils, LLC; Jean C. Edwards, Esq.

(57) ABSTRACT

A liquid-crystal display device having a backlight unit emitting unpolarized blue light, a light conversion member, a polarization separating member, a backlight-side polarizer, a liquid crystal cell, and a display-side polarizing plate wherein the polarization separating member separates the unpolarized blue light into blue transmitted light and blue reflected light which are linearly polarized in vibration directions that are orthogonal to each other, and transmits some of light in a wavelength range each of 500 nm to 600 nm and 600 nm to 650 nm, the light conversion member includes a fluorescent material that, due to blue light entering the light conversion member, emits green light which is linearly-polarized light and red light which is linearly-polarized light; and a transmission axis of the backlight-side polarizer is parallel to vibration directions of the green and red light, is improved in terms of front surface luminance and color reproduction region.

13 Claims, 3 Drawing Sheets

(52) U.S. Cl.
CPC .. *G02F 1/133536* (2013.01); *G02F 1/133617* (2013.01); *G02F 1/133621* (2013.01); *G02F 2001/133614* (2013.01); *G02F 2001/133638* (2013.01)

(58) Field of Classification Search
CPC .. G02B 5/3025; G02B 5/3083; G02B 5/3066; G02B 27/0172; G02B 6/0053; G02B 6/0056; G02F 1/13362; G02F 1/1335; G02F 1/133536; G02F 1/133528; G02F 1/133621; G02F 1/133514; G02F 1/133617; G02F 1/133615; G02F 1/13363; G02F 1/133504; G02F 1/133602; G02F 1/133606; G02F 1/133555; G02F 1/133603; G02F 1/13718; G02F 2001/133543; G02F 2001/133638; G02F 2001/133614; G02F 2001/133507; G02F 2001/133538; G02F 2001/133541; G02F 2001/133607; G02F 2001/133545; G02F 2001/133557; G02F 2001/133635; G02F 2203/09; G02F 2202/40; G02F 2413/08; C09K 19/02
See application file for complete search history.

(56) References Cited

U.S. PATENT DOCUMENTS

| | | | |
|---|---|---|---|
| 2012/0018764 A1* | 1/2012 | Choi | H01L 33/20 257/99 |
| 2012/0206935 A1 | 8/2012 | Seo et al. | |
| 2013/0083276 A1* | 4/2013 | Iwahashi | B41M 3/06 349/117 |
| 2014/0009902 A1* | 1/2014 | Banin | G02F 1/133617 362/19 |

FOREIGN PATENT DOCUMENTS

| | | |
|---|---|---|
| JP | H01-133003 A | 5/1989 |
| JP | 3448626 B2 | 9/2003 |
| JP | 2009-288312 A | 12/2009 |
| JP | 2010-096955 A | 4/2010 |
| JP | 2012-502322 A | 1/2012 |
| JP | 2012-169271 A | 9/2012 |
| WO | 95/17699 A1 | 6/1995 |
| WO | 2010/028728 A1 | 3/2010 |
| WO | 2012/059931 A1 | 5/2012 |
| WO | 2012/064562 A1 | 5/2012 |

OTHER PUBLICATIONS

Notification of Reason for Refusal issued by the Korean Intellectual Property Office dated Dec. 8, 2016, in connection with Korean Patent Application No. 10-2016-7001776.

International Search Report issued in connection with International Patent Application No. PCT/JP2014/069310 dated Oct. 7, 2014.

International Preliminary Report on Patentability issued in connection with International Patent Application No. PCT/JP2014/069310 dated Apr. 14, 2015.

Jian Chen et al.; A High-Efficiency Wide-Color-Gamut Solid-State Backlight System for LCDs Using Quantum Dot Enhancement Film; SID 2012 Digest; Jun. 2012; pp. 895-896; vol. 43, Issue 1; Society for Information Display; U.S.

International Preliminary Report on Patentability issued by WIPO dated Jan. 28, 2016 in connection with International Patent Application No. PCT/JP2014/069310.

Chinese Office Action issued by the State Intellectual Property Office of People's Republic of China dated Feb. 2, 2018, in connection with Chinese Patent Application No. 201480041574.1.

* cited by examiner

LIQUID-CRYSTAL DISPLAY DEVICE

CROSS-REFERENCE TO RELATED APPLICATIONS

This application is a Continuation of PCT International Application No. PCT/JP2014/069310, filed on Jul. 22, 2014, which was published under PCT Article 21(2) in Japanese, and claims priority under 35 U.S.C. Section 119(a) to Japanese Patent Application No. 2013-152055 filed on Jul. 22, 2013 and Japanese Patent Application No. 2014-146852 filed on Jul. 17, 2014. The above applications are hereby expressly incorporated by reference, in their entirety, into the present application.

BACKGROUND OF THE INVENTION

1. Field of the Invention

The present invention relates to a liquid-crystal display device.

2. Description of the Related Art

A liquid-crystal display device (hereinafter, also referred to as LCD) has been used in a broadening range of fields every year as an image display device which has low power consumption and saves spaces. A liquid-crystal display device has a constitution in which a backlight (hereinafter, also referred to as BL), a backlight-side polarizing plate, a liquid crystal cell, a display-side polarizing plate, and the like are provided in this order.

Recently, for liquid-crystal display devices, development for power saving, high definition, and color reproducibility improvement has been underway in order to improve LCD performance. At the moment, while there is a significant demand for power saving, high definition, and color reproducibility improvement particularly in small-sized display devices such as table PCs and smartphones, development of next-generation Hi-visions (4K2K, EBU ratio of 100% or higher) with current TV standards (FHD, 72% of National Television System Committee (NTSC) ratio≈100% of European Broadcasting Union (EBU) ratio) is also underway for large-sized display devices. Therefore, there is an intensifying demand for power saving, high definition, and color reproducibility improvement in liquid-crystal display devices.

In accordance with power saving in the backlight, there are cases in which an optical sheet member having a luminance-improving function is provided between the backlight and the backlight-side polarizing plate. This optical sheet member is an optical element that transmits only light rays vibrating in a specific polarization direction among incidence light rays vibrating in random directions and reflects light rays vibrating in other polarization directions. As a core member of a low-power LCD developed in response to an increase in mobile devices and a decrease in the power consumption of home appliance, it is expected to increase luminance (the degree of brightness of a light source per unit area) by solving the low optical efficiency of LCDs.

As the above-described member, a technique is known in which a specific optical sheet member (Dual Brightness Enhancement Film (registered trademark, DBEF) or the like) is combined between the backlight and the backlight-side polarizing plate so as to improve the light utilization ratio of the BL by means of light recycling and thus the luminance of the BL is improved while saving power in the backlight (refer to JP3448626B). Similarly, JP1989-133003A (JP-H1-133003A) describes a technique in which the light utilization ratio of the BL is improved by means of light recycling by broadening the bandwidths in a polarizing plate obtained by laminating a λ/4 plate and a cholesteric liquid crystalline phase and in a layer formed by fixing three or more layers of a cholesteric liquid crystalline phase having different pitches between the cholesteric liquid crystalline phases.

However, the above-described optical sheet member has a complicated member constitution, and thus, in order to distribute the optical sheet member in the market, it becomes essential to reduce the cost by decreasing the number of members by means of additional integration of functions of the members.

Meanwhile, from the viewpoint of high definition and color reproducibility improvement of a liquid-crystal display device, a method for sharpening the light emission spectrum of the backlight is also known. For example, JP2012-169271A describes a method for increasing luminance and improving color reproducibility by realizing white light using a quantum dot (QD) which emits red light and green light as a fluorescent body between a blue LED and a light guide plate. In SID'12 DIGEST p. 895, a method of combining a light conversion sheet (QDEF, also referred to as quantum dot sheet) in which a quantum dot is used in order to improve the color reproducibility of the LCD is proposed.

SUMMARY OF THE INVENTION

In JP3448626B and JP1989-133003A (JP-H1-133003A) in which the light utilization ratio is improved, since a broadband light recycling function with respect to white light is imparted, the design becomes complicated due to a multilayer constitution and the wavelength dispersibility of the members, and thus there is a problem of high manufacturing costs. In addition, in the fluorescent light (PL) application techniques described in JP2012-169271A and STD'12 DIGEST p. 895, high luminance and color reproducibility improvement are realized using a quantum dot (hereinafter, also referred to as QD) and white light; however, for additional improvement of the luminance, a combination of JP3448626B and JP1989-133003A (JP-H1-133003A) thereinto is essential, and thus there is the same problem as described above.

Improvement in the light utilization ratio of the BL, which is required for power saving, and high definition (a decrease in the opening ratio) and color reproducibility improvement (a decrease in the transmittance of a color filter (hereinafter, also referred to as CF)) have a trade-off relationship, and thus an object of the present invention is to provide a liquid-crystal display device having a new member constitution in order to improve the light utilization ratio and satisfy color reproducibility. In addition, another object of the present invention is to reduce the cost by decreasing the number of members by means of additional integration of functions of the members.

That is, the object of the present invention is to provide a liquid-crystal display device in which front surface luminance and a color reproduction region are improved.

The present inventors carried out intensive studies in order to achieve the above-described object and consequently found that, when a polarization separating member in which transmitted light and reflected light are linearly polarized in vibration directions in which the polarizations thereof are orthogonal to each other and which has a polarization separating function with respect to blue light but does not have a polarization separating function with respect to green light and red light, a light conversion member sheet including a fluorescent material (organic, inorganic, quantum dot, or the like) that emits green light and red light when blue light enters, and a blue light source are combined together, it is possible to increase the light utilization ratio by suppressing absorption of blue light on a backlight side of a liquid crystal cell, to improve a color reproduction region more than in a case in which a broadband white light source is used, and to achieve the above-described object.

That is, the above-described object is achieved using the present invention having the following constitutions.

[1] A liquid-crystal display device including: a backlight unit, a light conversion member, a polarization separating member, a backlight-side polarizer, a liquid crystal cell, and a display-side polarizing plate, which are disposed in this order, in which the backlight unit includes a light source that emits the unpolarized blue light having a light emission central wavelength in a wavelength range of 430 nm to 480 nm, the polarization separating member separates unpolarized blue light entering in a normal direction to the polarization separating member into blue transmitted light and blue reflected light which are linearly polarized in vibration directions that are orthogonal to each other, transmits at least some of light in a wavelength range of 500 nm to 600 nm, and transmits at least some of light in a wavelength range of 600 nm to 650 nm, the light conversion member includes a fluorescent material that, due to blue light entering the light conversion member, emits green light which has a light emission central wavelength in a wavelength range of 500 nm to 600 nm and is linearly-polarized light and red light which has a light emission central wavelength in a wavelength range of 600 nm to 650 nm and is linearly-polarized light, and a transmission axis of the backlight-side polarizer is parallel to vibration directions of the green light and the red light.

[2] The liquid-crystal display device according to [1], in which, preferably, the polarization separating member includes a first λ/4 plate, a light reflection layer formed by fixing a cholesteric liquid crystalline phase, and a second λ/4 plate in this order, the light reflection layer formed by fixing a cholesteric liquid crystalline phase has a reflection central wavelength in a wavelength range of 430 nm to 480 nm, reflects one of right-circularly-polarized light and left-circularly-polarized light at the reflection central wavelength, transmits the other, transmits at least some of light in a wavelength range of 500 nm to 600 nm, and transmits at least some of light in a wavelength range of 600 nm to 650 nm, slow axes of the first λ/4 plate and the second λ/4 plate are orthogonal to each other, retardations in the first λ/4 plate and the second λ/4 plate in an in-plane direction at the light emission central wavelength of the unpolarized blue light are equal to each other, and the first λ/4 plate and the second λ/4 plate satisfy Expression (1) below.

$$Re(\lambda) = \lambda/4 \pm 10 \text{ nm} \quad \text{Expression (1)}$$

(In Expression (1), λ represents the light emission central wavelength (unit: nm) of the unpolarized blue light, and Re (λ) represents a retardation (unit: nm) in the in-plane direction at a wavelength of λ nm.)

[3] The liquid-crystal display device according to [1] or [2], in which the fluorescent material preferably includes at least a quantum dot.

[4] The liquid-crystal display device according to [3], in which the quantum dot is preferably a quantum rod having an ellipsoid shape or a rectangular parallelepiped shape.

[5] The liquid-crystal display device according to [4], in which a long-axis direction of the quantum rod is preferably aligned in a direction parallel to the transmission axis of the backlight-side polarizer.

[6] The liquid-crystal display device according to any one of [1] to [5], in which both the green light and the red light emitted from the light conversion member preferably have a peak with a light emission intensity a half bandwidth of which is 100 nm or smaller.

[7] The liquid-crystal display device according to any one of [1] to [6], in which the entire backlight unit is preferably a surface light source.

[8] The liquid-crystal display device according to any one of [2] to [7], in which, preferably, a light emission central wavelength of unpolarized blue light emitted from the backlight unit is in a wavelength range of 440 nm to 460 nm; a reflection central wavelength of the light reflection layer formed by fixing a cholesteric liquid crystalline phase is in a wavelength range of 440 nm to 460 nm; and the light emission central wavelength of the unpolarized blue light emitted from the backlight unit and the reflection central wavelength of the light reflection layer formed by fixing the cholesteric liquid crystalline phase coincide with each other.

[9] The liquid-crystal display device according to any one of [1] to [8], in which the unpolarized blue light emitted from the backlight unit preferably has a peak with a light emission intensity a half bandwidth of which is 100 nm or smaller.

[10] The liquid-crystal display device according to any one of [1] to [9], in which the polarization separating member and the backlight-side polarizer are preferably disposed adjacent to each other directly or through an adhesive layer.

[11] The liquid-crystal display device according to any one of [1] to [10], including two polarizing plate protective films disposed on both surfaces of the backlight-side polarizer, in which at least the polarizing plate protective film on a polarization separating member side out of the two polarizing plate protective films is preferably a cellulose acylate film.

[12] The liquid-crystal display device according to any one of [1] to [11], in which a luminance-improving film is preferably further disposed.

[13] The liquid-crystal display device according to any one of [1] to [12], in which the backlight unit preferably includes a reflection member.

According to the present invention, it is possible to provide a liquid-crystal display device in which front surface luminance and a color reproduction region are improved.

DESCRIPTION OF THE PREFERRED EMBODIMENTS

Hereinafter, a liquid-crystal display device of the present invention will be described in detail.

Constitution requirements described below will be, in some cases, described based on a typical embodiment of the present invention, but the present invention is not limited to the above-described embodiment. Meanwhile, in the present specification, numerical ranges expressed using "to" include numerical values before and after the "to" as the lower limit value and the upper limit value.

In the present specification, the "half bandwidth" of a peak refers to the width of the peak at the half of the peak height. Unpolarized light refers to light not having polarization characteristics.

[Liquid-crystal Display Device]

In a liquid-crystal display device of the present invention, a backlight unit, a light conversion member, a polarization separating member, a backlight-side polarizer, a liquid crystal cell, and a display-side polarizing plate are disposed in this order; the backlight unit includes a light source that emits unpolarized blue light having a light emission central wavelength in a wavelength range of 430 nm to 480 nm; the polarization separating member separates unpolarized blue light entering in a normal direction to the polarization separating member into blue transmitted light and blue reflected light which are linearly polarized in vibration directions that are orthogonal to each other, transmits at least some of the light in a wavelength range of 500 nm to 600 nm, and transmits at least some of the light in a wavelength range of 600 nm to 650 nm; and the light conversion member includes a fluorescent material that, due to blue light entering the light conversion member, emits green light which has a light emission central wavelength in a wavelength range of 500 nm to 600 nm and is linearly-polarized light and red light which has a light emission central wavelength in a wavelength range of 600 nm to 650 nm and is linearly-polarized light; and a transmission axis of the backlight-side polarizer is parallel to vibration directions of the green light and the red light.

The above-described constitution improves the front surface luminance and color reproduction region of the liquid-crystal display device of the present invention, and the thicknesses of the members can also be decreased by reducing the number of the members. Since the transmission axis of the backlight-side polarizer is parallel to the vibration direction of the green light and the red light, both the green light and the red light (preferably blue transmitted light) are capable of passing through the backlight-side polarizer, and the light utilization ratio can be increased by suppressing absorption of unpolarized blue light on the backlight side of the liquid crystal cell.

First, the constitution of the liquid-crystal display device of the present invention will be described using the drawings.

Figure 1:
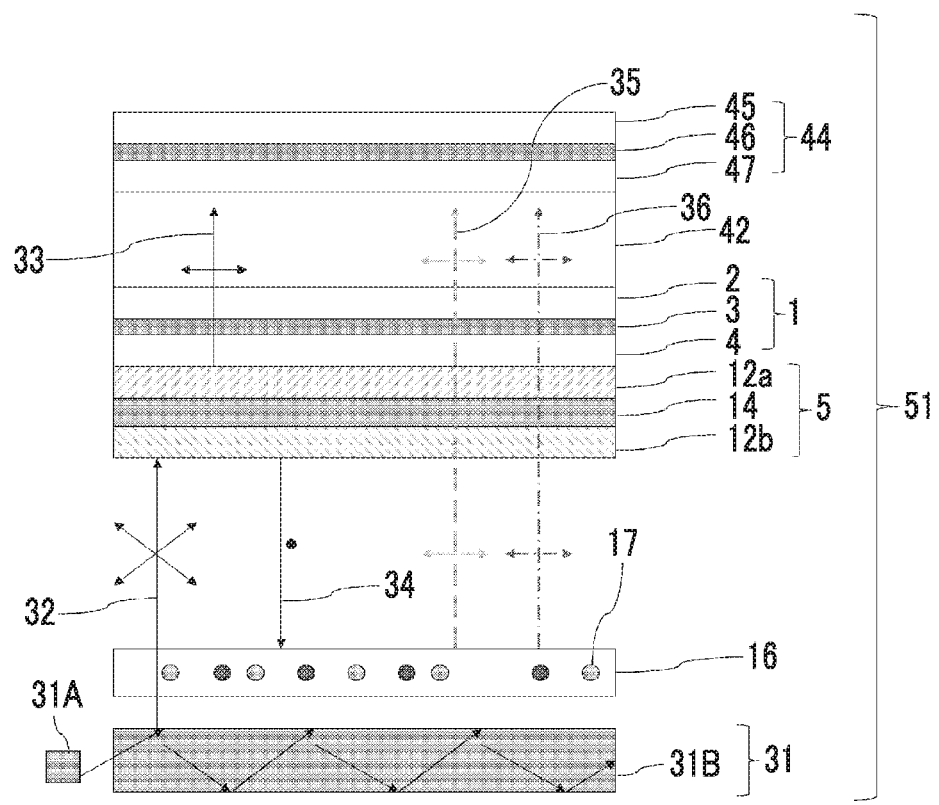
FIG. 1 is a schematic view illustrating a section of an example of a liquid-crystal display device of the present invention.
Figure 2:
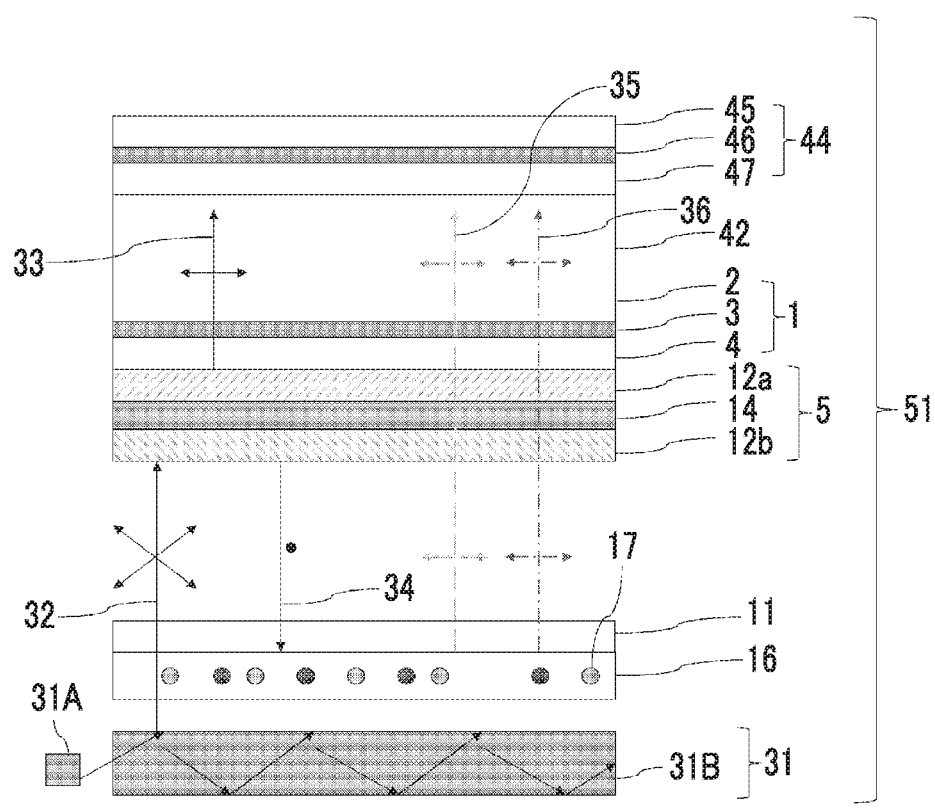
FIG. 2 is a schematic view illustrating a section of another example of the liquid-crystal display device of the present invention in which a prism sheet is further provided as a luminance-improving film.
Figure 3:
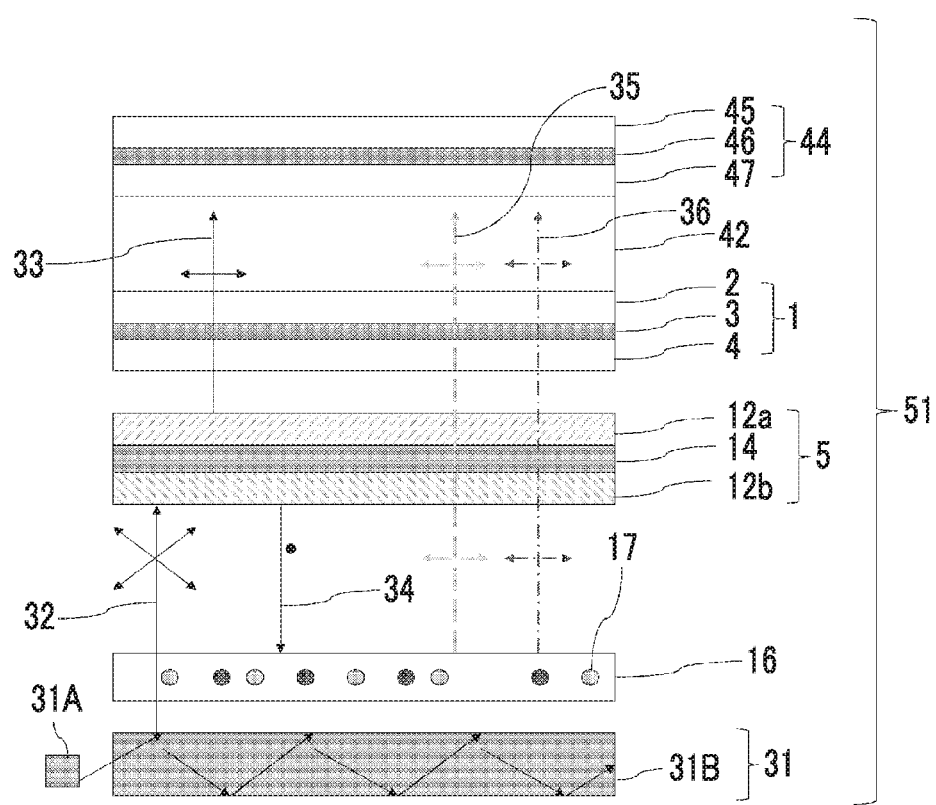
FIG. 3 is a schematic view illustrating a section of an example of the liquid-crystal display device of the present invention in which a polarization separating member is not in contact with a backlight-side polarizer.

FIGS. 1 to 3 illustrate schematic views of the liquid-crystal display device of the present invention.

A liquid-crystal display device 51 of the present invention illustrated in FIGS. 1 to 3 includes a backlight unit 31, a light conversion member 16, a polarization separating member 5, a backlight-side polarizer 3, a liquid crystal cell 42, and a display-side polarizing plate 44.

The backlight unit 31 includes a light source 31A that emits unpolarized blue light having a light emission central wavelength in a wavelength range of 430 nm to 480 nm. The backlight unit 31 preferably includes a light guide plate 31B or the like for being used as a surface light source.

The polarization separating member 5 is capable of separating unpolarized blue light 32 entering in the normal direction to the polarization separating member 5 into blue transmitted light 33 and blue reflected light 34 which are linearly polarized in vibration directions that are orthogonal to each other, of transmitting at least some of the light in a wavelength range of 500 nm to 600 nm (for example, at least some, preferably all, of green light 35 emitted from the light conversion member), and of transmitting at least some of the light in a wavelength range of 600 nm to 650 nm (for example, at least some, preferably all, of red light 36 emitted from the light conversion member).

As a specific constitution of the polarization separating member 5, a constitution including a first $\lambda/4$ plate 12a, a light reflection layer 14 formed by fixing a cholesteric liquid crystalline phase, and a second $\lambda/4$ plate 12b, which are illustrated in FIGS. 1 to 3, in this order is preferred. At this time, the slow axes of the first $\lambda/4$ plate 12a and the second $\lambda/4$ plate 12b are orthogonal to each other, and the retardations in the first $\lambda/4$ plate 12a and the second $\lambda/4$ plate 12b in an in-plane direction at the light emission central wavelength of the unpolarized blue light are equal to each other. However, the polarization separating member 5 is not limited to the constitutions illustrated in FIGS. 1 to 3.

In the constitution including the first $\lambda/4$ plate 12a, the light reflection layer 14 formed by fixing a cholesteric liquid crystalline phase, and the second $\lambda/4$ plate 12b in this order, the unpolarized blue light 32 entering in the normal direction to the polarization separating member 5 is converted to right-circularly-polarized light and left-circularly-polarized light when passing through the second $\lambda/4$ plate 12b. Regarding the right-circularly-polarized and left-circularly-polarized blue light (not illustrated) passing through the second $\lambda/4$ plate 12b, the light reflection layer 14 formed by fixing a cholesteric liquid crystalline phase reflects one of the right-circularly-polarized light and the left-circularly-polarized light (for example, the right-circularly-polarized light) and transmits the other (for example, the left-circularly-polarized light). The circularly-polarized light reflected by the light reflection layer 14 formed by fixing a cholesteric liquid crystalline phase (for example, the right-circularly-polarized light) further passes through the second $\lambda/4$ plate 12b, turns into linearly-polarized blue reflected light 34, and proceeds to the light conversion member 16. The other circularly-polarized light passing through the light reflection layer 14 formed by fixing a cholesteric liquid crystalline phase (for example, the left-circularly-polarized light) further passes through the first $\lambda/4$ plate 12a, turns into linearly-polarized blue transmitted light 33, and proceeds to the backlight-side polarizer 3.

At this time, since the slow axes of the first $\lambda/4$ plate 12a and the second $\lambda/4$ plate 12b are orthogonal to each other, the blue reflected light 34 and the blue transmitted light 33 turn into linearly-polarized lights in vibration directions in which polarization directions are orthogonal to each other. FIGS. 1 to 3 illustrate aspects in which the blue transmitted light 33 turns into linearly-polarized light in a vibration direction parallel to the surfaces of the drawings and the blue reflected light 34 turns into linearly-polarized light in a vibration direction perpendicular to the surfaces of the drawings. In a case in which, for example, the first $\lambda/4$ plate and the second $\lambda/4$ plate function as $\lambda/4$ plates even in the wavelength ranges of the green light and the red light, the green light 35 which is linearly-polarized light having the same polarization direction as that of the blue transmitted light 33 and the red light 36 which is linearly-polarized light having the same polarization direction as that of the blue transmitted light 33 pass through the second λ/4 plate 12b, thus, are converted to one circularly-polarized lights (for example, right-circularly-polarized light), pass through the light reflection layer 14 formed by fixing a cholesteric liquid crystalline phase, pass through the first λ/4 plate 12a having a slow axis orthogonal to that of the second λ/4 plate 12b, thus, are converted to linearly-polarized lights in the original polarization direction from the previous circularly-polarized lights (for example, right-circularly-polarized light), and proceed to the backlight-side polarizer 3. Meanwhile, even in a case in which the first λ/4 plate and the second λ/4 plate, conversely, do not function as λ/4 plates even in the wavelength ranges of the green light and the red light, if the retardations in the first λ/4 plate and the second λ/4 plate in the in-plane direction are the same as each other, changes in the polarization states by the first λ/4 plate and the second λ/4 plate are offset and cancelled, and thus the green light 35 which is linearly-polarized light having the same polarization direction as that of the blue transmitted light 33 and the red light 36 which is linearly-polarized light having the same polarization direction as that of the blue transmitted light 33 are converted to linearly-polarized lights in the original polarization direction, and proceed to the backlight-side polarizer 3.

Since the transmission axis of the backlight-side polarizer 3 is parallel to the vibration direction of the blue transmitted light 33, the green light 35, and the red light 36, the blue transmitted light 33, the green light 35, and the red light 36 are capable of passing through the backlight-side polarizer 3.

The light conversion member 16 includes a fluorescent material 17 that, due to blue light entering the light conversion member 16, emits the green light 35 which has a light emission central wavelength in a wavelength range of 500 nm to 600 nm and is linearly-polarized light (preferably in the same vibration direction as the transmission axis of the backlight-side polarizer 3) and the red light 36 which has a light emission central wavelength in a wavelength range of 600 nm to 650 nm and is linearly-polarized light (preferably in the same vibration direction as the transmission axis of the backlight-side polarizer 3).

The backlight-side polarizer 3 is disposed so that the transmission axis of the backlight-side polarizer 3 is parallel to the vibration direction of the green light 35 and the red light 36. The backlight-side polarizer 3 having a polarizing plate protective film laminated and disposed on at least any one of the surfaces thereof is called a backlight-side polarizing plate 1. The constitution of the backlight-side polarizing plate is not particularly limited, a well-known constitution can be employed, and it is possible to employ a constitution of a laminate including a polarizing plate protective film (inner side) 2, the polarizer 3, and a polarizing plate protective film (outer side) 4. In addition, it is also possible to employ, for example, an inner component-free constitution in which the polarizing plate protective film is not provided on the inner side and an adhesive or a coated film is directly provided on the polarizer. In addition, furthermore, the polarization separating member can be used as the polarizing plate protective film on the outer side. That is, it is possible to use the polarization separating member 5 as the polarizing plate protective film 4 on the outer side included in the backlight-side polarizing plate.

The display-side polarizing plate 44 is not particularly limited, and a well-known constitution can be employed. For example, it is possible to employ a constitution of a laminate including a polarizing plate protective film (outer side) 45, a polarizer 46, and a polarizing plate protective film (inner side) 47.

As illustrated in FIG. 2, the liquid-crystal display device of the present invention preferably further includes a luminance-improving film 11 disposed between the light conversion member 16 and the polarization separating member 5, and examples of the luminance-improving film 11 include a well-known prism sheet and a well-known diffusion plate. However, in the liquid-crystal display device of the present invention, the disposition position of the luminance-improving film 11 is not limited to the aspect illustrated in FIG. 2, and the luminance-improving film may be disposed between the light conversion member 16 and the backlight unit 31.

In the liquid-crystal display device 51 of the present invention, the polarization separating member 5 and the backlight-side polarizer 3 may be disposed adjacent to each other directly or through an adhesive layer, not illustrated, or the polarizing plate protective film 4 on the outer side (refer to FIGS. 1 and 2) or may be disposed separate from each other through an air layer (refer to FIG. 3). In the liquid-crystal display device 51 of the present invention, the polarization separating member 5 and the backlight-side polarizer are preferably disposed adjacent to each other directly or through an adhesive layer from the viewpoint of improving luminance by suppressing interface reflection.

Next, regarding the respective members constituting the liquid-crystal display device of the present invention, a preferred aspect will be described.

<<Backlight Unit>>

In the liquid-crystal display device of the present invention, the backlight unit includes a light source that emits unpolarized blue light having a light emission central wavelength in a wavelength range of 430 nm to 480 nm.

A backlight may be either an edge light mode having a light guide plate, a reflection plate, or the like as a constitutional member or a direct backlight mode; however, in the liquid-crystal display device of the present invention, the entire backlight unit is preferably a surface light source. In the liquid-crystal display device of the present invention, in a case in which the backlight unit is a light source or an edge light mode, a reflection member that reflects light emitted from the light source and reflected by the polarization separating member (repetitive retroreflection) (in some cases, referred to as a light guiding device or an optical resonator) is preferably provided in a rear portion of the liquid guide plate. Any member may be used as the reflection member as long as the member is capable of improving the brightness of the liquid-crystal display device, and the reflection member may randomize the direction and state of the polarization of light emitted from the light source and reflected by the polarization separating member and recirculate the light. The reflection member is not particularly limited, and a well-known reflection member can be used. The reflection member is described in JP3416302B, JP3363565B, JP4091978B, JP3448626B, and the like, the contents of which are incorporated into the present invention.

In the liquid-crystal display device of the present invention, the light source of the backlight unit preferably includes a blue light-emitting diode that emits blue light.

In the liquid-crystal display device of the present invention, the backlight unit preferably includes a wavelength selective filter for blue color which selectively transmits blue light having a wavelength shorter than 460 nm.

The above-described wavelength selective filter for blue color is not particularly limited, and a well-known filter can be used. The wavelength selective filter for blue color is described in JP2008-52067A and the like, the content of which is incorporated into the present invention.

The backlight unit also preferably includes, additionally, a well-known diffusion plate or diffusion sheet, a prism sheet (for example, BEF or the like), and a luminance-improving film such as a light guiding device. Additional members that the backlight unit preferably includes are also described in JP3416302B, JP3363565B, JP4091978B, JP3448626B, and the like, the contents of which are incorporated into the present invention.

In the liquid-crystal display device of the present invention, the unpolarized blue light emitted from the backlight unit preferably has a light emission central wavelength in a wavelength range of 440 nm to 460 nm.

In the liquid-crystal display device of the present invention, the unpolarized blue light emitted from the backlight unit preferably has a peak with a light emission intensity the half bandwidth of which is 100 nm or smaller, more preferably has a peak with a light emission intensity the half bandwidth of which is 80 nm or smaller, and particularly preferably has a peak with a light emission intensity the half bandwidth of which is 70 nm or smaller.

In the liquid-crystal display device of the present invention, the light emission central wavelength of the unpolarized blue light emitted from the backlight unit and the reflection central wavelength of the light reflection layer formed by fixing a cholesteric liquid crystalline phase included in the polarization separating member preferably coincide with each other. In the present specification, two wavelengths "coinciding with each other" means not only a case in which two wavelengths completely coincide with each other but also a case in which two wavelengths differ from each other within an optically acceptable range. The difference between the light emission central wavelength of the unpolarized blue light emitted from the backlight unit and the reflection central wavelength of the light reflection layer formed by fixing a cholesteric liquid crystalline phase included in the polarization separating member is preferably 50 nm or smaller, more preferably 20 nm or smaller, and particularly preferably 10 nm or smaller.

<Light Conversion Member>

The liquid-crystal display device of the present invention includes the light conversion member and includes a fluorescent material that, due to blue light entering the light conversion member, emits green light which has a light emission central wavelength in a wavelength range of 500 nm to 600 nm and is linearly-polarized light and red light which has a light emission central wavelength in a wavelength range of 600 nm to 650 nm and is linearly-polarized light.

In order for the light conversion member to eject linearly-polarized light, the light conversion member is desirably aligned.

In the liquid-crystal display device of the present invention, both the green light and the red light emitted from the light conversion member preferably have a peak with a light emission intensity the half bandwidth of which is 100 nm or smaller, more preferably have a peak with a light emission intensity the half bandwidth of which is 80 nm or smaller, and particularly preferably have a peak with a light emission intensity the half bandwidth of which is 70 nm or smaller.

Examples of an inorganic fluorescent material include yttrium-aluminum-carbonate-based yellow fluorescent bodies, terbium-aluminum-carbonate-based yellow fluorescent bodies, and the like. The fluorescent wavelength of the fluorescent material can be controlled by changing the particle diameter of the fluorescent body. Additionally, the fluorescent material described in JP2010-532005A can be used.

In addition, an organic fluorescent material can also be used, and, for example, the fluorescent materials described in JP2001-174636A, JP2001-174809A, and the like can be used.

In the liquid-crystal display device of the present invention, the fluorescent material preferably includes at least a quantum dot.

The light conversion member including the fluorescent material is preferably a quantum dot sheet, a thermoplastic film obtained by being stretched after a quantum dot material is dispersed, or an adhesive layer in which a quantum dot material is dispersed.

In a case in which the light conversion member including the fluorescent material is a quantum dot sheet, the quantum dot sheet is not particularly limited, and a well-known quantum dot sheet can be used. The quantum dot sheet is described in, for example, JP2012-169271A, SID'12 DIGEST p. 895, JP2010-532005A, and the like, the contents of which are incorporated into the present invention. In addition, a quantum dot enhancement film (QDEF, manufactured by Nanosys Inc) is an example of the above-described quantum dot sheet.

In a case in which the light conversion member including the fluorescent material is an adhesive layer in which a quantum dot material is dispersed, the adhesive layer is not particularly limited, and it is possible to use an adhesive layer obtained by dispersing the quantum dot material or the like in a well-known adhesive layer which is described in JP2012-169271A, SID'12 DIGEST p. 895, JP2001-174636A, JP2001-174809A, JP2010-532005A, and the like.

In the liquid-crystal display device of the present invention, the quantum dot included in the light conversion member is preferably a quantum rod formed by aligning ellipsoid-shape or rectangular parallelepiped-shape particles.

The above-described ellipsoid-shape or rectangular parallelepiped-shape quantum rod is not particularly limited, the ellipsoid-shape or rectangular parallelepiped-shape quantum rod described in U.S. Pat. No. 7,303,628A, a dissertation (Peng, X. G; Manna, L.; Yang, W. D.; Wickham, j.; Scher, E.; Kadavanich, A.; Alivisatos, A. P. Nature 2000, 404, 59 to 61), and a dissertation (Manna, L.; Scher, E. C.; Alivisatos, A. P. j. Am. Chem. Soc. 2000, 122, 12700 to 12706), and the like can be used, and the contents thereof are incorporated into the present invention. The method for observing the shape of the quantum rod is not particularly limited, and the shape of the quantum rod can be observed using a transmission electron microscope.

In the liquid-crystal display device of the present invention, the long-axis direction of the quantum rod is preferably aligned in a direction parallel to the transmission axis of the backlight-side polarizer since, then, it is possible to emit linearly-polarized light in a certain desired vibration direction (a direction parallel to the transmission axis of the backlight-side polarizer) irrespective of the vibration direction of linearly-polarized light entering the light conversion member. The method for observing the long-axis direction of the quantum rod is not particularly limited, and the long-axis of the quantum rod can be observed using a transmission electron microscope.

The method for aligning the long-axis direction of the quantum rod in a direction parallel to the transmission axis of the backlight-side polarizer is not particularly limited, and examples thereof include the following methods.

As the light conversion member including the fluorescent material, a thermoplastic film obtained by being stretched after the quantum rod material is dispersed can be used. The above-described thermoplastic film is not particularly limited, and a well-known thermoplastic film can be used. The thermoplastic film is described in, for example, JP2001-174636A, JP2001-174809A, and the like, the contents of which are incorporated into the present invention.

<Polarization Separating Member>

In the liquid-crystal display device of the present invention, the polarization separating member separates unpolarized blue light entering in the normal direction to the polarization separating member into blue transmitted light and blue reflected light which are linearly polarized in vibration directions that are orthogonal to each other, transmits at least some of the light in a wavelength range of 500 nm to 600 nm, and transmits at least some of the light in a wavelength range of 600 nm to 650 nm. That is, out of a wavelength range of 430 nm to 480 nm, it is preferable that the polarization separating member exhibits a polarization separating function with respect to unpolarized blue light having a light emission central wavelength in at least a wavelength range of 430 nm to 480 nm, which is emitted from the backlight unit, and does not exhibit a polarization separating function with respect to light in a wavelength range of 500 nm to 650 nm.

The fact that the polarization separating member transmits light in at least a part of a wavelength range of 500 nm to 600 nm is not limited to an aspect in which the transmittance is 100% in the entire wavelength range of 500 nm to 600 nm, and the transmittance may be high enough to be optically acceptable in the liquid-crystal display device at a desired wavelength in the wavelength range of 500 nm to 600 nm. Specifically, the polarization separating member preferably transmits at least some of green light (preferably linearly-polarized light in the same vibration direction as green reflected light) having a light emission central wavelength in a wavelength range of 500 nm to 600 nm, which is emitted from the light conversion member, more preferably transmits light having the light emission central wavelength of the green light, and particularly preferably transmits all the light emission peaks of the green light. In the polarization separating member, the peak of the maximum reflection ratio in a wavelength range of 500 nm to 600 nm is preferably 20% or lower, the peak of the maximum reflection ratio in a wavelength range of 500 nm to 600 nm is more preferably 10% or lower, and the peak of the maximum reflection ratio in a wavelength range of 500 nm to 600 nm is particularly preferably 5% or lower.

The fact that the polarization separating member transmits light in at least a part of a wavelength range of 600 nm to 650 nm is not limited to an aspect in which the transmittance is 100% in the entire wavelength range of 600 nm to 650 nm, and the transmittance may be high enough to be optically acceptable in the liquid-crystal display device at a desired wavelength in the wavelength range of 600 nm to 650 nm. Specifically, the polarization separating member preferably transmits at least some of red light (preferably linearly-polarized light in the same vibration direction as blue reflected light) having a light emission central wavelength in a wavelength range of 600 nm to 650 nm, which is emitted from the light conversion member, more preferably transmits light having the light emission central wavelength of the red light, and particularly preferably transmits all the light emission peaks of the red light. In the polarization separating member, the peak of the maximum reflection ratio in a wavelength range of 600 nm to 650 nm is preferably 20% or lower, the peak of the maximum reflection ratio in a wavelength range of 600 nm to 650 nm is more preferably 10% or lower, and the peak of the maximum reflection ratio in a wavelength range of 600 nm to 650 nm is particularly preferably 5% or lower.

In the polarization separating member, the polarization state of light in a wavelength range of 500 nm to 650 nm, which enters the polarization separating member, and the polarization state of light in a wavelength range of 500 nm to 650 nm, which is emitted from the polarization separating member, preferably become substantially identical to each other, and specifically, the vibration direction of linearly-polarized light in a wavelength range of 500 nm to 650 nm, which enters the polarization separating member, and the vibration direction of linearly-polarized light in a wavelength range of 500 nm to 650 nm, which is emitted from the polarization separating member, are preferably parallel to each other. However, when the polarization states of light which enters the polarization separating member and light which is emitted from the polarization separating member become substantially identical to each other, the polarization state of light in a wavelength range of 500 nm to 650 nm, which enters the polarization separating member, may change while the light passes through the polarization separating member, and, for example, the light may pass through two $\lambda/4$ plates having slow axes orthogonal to each other in the polarization separating member.

The total film thickness of the polarization separating member is preferably in a range of 1 μm to 130 μm, more preferably in a range of 1 μm to 70 μm, and particularly preferably in a range of 1 μm to 10 μm.

In the liquid-crystal display device of the present invention, preferably, the polarization separating member includes a first $\lambda/4$ plate, a light reflection layer formed by fixing a cholesteric liquid crystalline phase, and a second $\lambda/4$ plate in this order, the light reflection layer formed by fixing a cholesteric liquid crystalline phase has a reflection central wavelength in a wavelength range of 430 nm to 480 nm, reflects one of right-circularly-polarized light and left-circularly-polarized light at the reflection central wavelength, transmits the other, transmits at least some of the light in a wavelength range of 500 nm to 600 nm, and transmits at least some of the light in a wavelength range of 600 nm to 650 nm, the slow axes of the first $\lambda/4$ plate and the second $\lambda/4$ plate are orthogonal to each other, retardations in the first $\lambda/4$ plate and the second $\lambda/4$ plate in an in-plane direction at the light emission central wavelength of the unpolarized blue light are equal to each other, and the first $\lambda/4$ plate and the second $\lambda/4$ plate satisfy Expression (1) below.

$$Re(\lambda)=\lambda/4\pm10 \text{ nm} \qquad \text{Expression (1)}$$

(In Expression (1), $\lambda$ represents the light emission central wavelength (unit: nm) of the unpolarized blue light, and Re ($\lambda$) represents a retardation (unit: nm) in the in-plane direction at a wavelength of $\lambda$ nm.)

Hereinafter, the polarization separating member of the above-described aspect will be described.

The light reflection layer formed by fixing a cholesteric liquid crystalline phase is capable of reflecting at least one of right-circularly-polarized light and left-circularly-polarized light in a wavelength range near the reflection central wavelength. In addition, the $\lambda/4$ plate is capable of converting light having a wavelength of $\lambda$ nm in a specific range from circularly-polarized light to linearly-polarized light, of converting unpolarized light to circularly-polarized light in both directions, or of converting linearly-polarized light to circularly-polarized light. When the polarization separating member has the above-described constitution, unpolarized light is converted to circularly-polarized light in both directions by the second λ/4 plate, light in a first polarization state (for example, right-circularly polarized) is substantially reflected by the light reflection layer formed by fixing a cholesteric liquid crystalline phase, on the other hand, light in a second polarization state (for example, left-circularly polarized) is substantially transmitted through the light reflection layer formed by fixing a cholesteric liquid crystalline phase, and the light in the second polarization state (for example, left-circularly polarized) which has transmitted through the light reflection layer formed by fixing a cholesteric liquid crystalline phase is converted to linearly-polarized light by the first λ/4 plate, whereby the light is capable of substantially passing through the polarizer (linear polarizer) in the polarizing plate.

(Light Reflection Layer Formed by Fixing a Cholesteric Liquid Crystalline Phase)

The light reflection layer formed by fixing a cholesteric liquid crystalline phase preferably has a reflection central wavelength in a wavelength range of 430 nm to 480 nm, reflects one of right-circularly-polarized light and left-circularly-polarized light at the reflection central wavelength, transmits the other, transmits at least some of the light in a wavelength range of 500 nm to 600 nm, and transmits at least some of the light in a wavelength range of 600 nm to 650 nm.

From the viewpoint of decreasing the film thickness of the polarization separating member, the polarization separating member preferably includes only one light reflection layer formed by fixing a cholesteric liquid crystalline phase, that is, preferably does not include additional layers formed by fixing a cholesteric liquid crystalline phase. Meanwhile, the polarization separating member may include two or more light reflection layers formed by fixing a cholesteric liquid crystalline phase as long as the polarization separating member reflects one of right-circularly-polarized light and left-circularly-polarized light at the reflection central wavelength and transmits the other; however, in this case, the directions of circularly-polarized lights that the two or more light reflection layers formed by fixing a cholesteric liquid crystalline phase are capable of reflecting are set in the same direction, and it is possible to reflect one of right-circularly-polarized light and left-circularly-polarized light at the reflection central wavelength and transmit the other.

The light reflection layer formed by fixing a cholesteric liquid crystalline phase has a reflection central wavelength in a wavelength range of 430 nm to 480 nm, and the reflection central wavelength of the light reflection layer formed by fixing a cholesteric liquid crystalline phase is preferably in a wavelength range of 430 nm to 470 nm and more preferably in a wavelength range of 440 nm to 460 nm.

At the reflection central wavelength of the light reflection layer formed by fixing a cholesteric liquid crystalline phase, the half bandwidth of a peak of the reflection ratio is preferably 100 nm or smaller, the half bandwidth of a peak of the reflection ratio is more preferably 80 nm or smaller, and the half bandwidth of a peak of the reflection ratio is particularly preferably 70 nm or smaller.

In the liquid-crystal display device of the present invention, the reflection central wavelength of the light reflection layer formed by fixing a cholesteric liquid crystalline phase is in a wavelength range of 440 nm to 460 nm, and the light emission central wavelength of the unpolarized blue light emitted from the backlight unit and the reflection central wavelength of the light reflection layer formed by fixing a cholesteric liquid crystalline phase preferably coincide with each other.

The light reflection layer formed by fixing a cholesteric liquid crystalline phase preferably transmits at least some of the light in a wavelength range of 500 nm to 600 nm and transmits at least some of the light in a wavelength range of 600 nm to 650 nm.

Examples of a method for producing the light reflection layer formed by fixing a cholesteric liquid crystalline phase which is capable of transmitting light in a wavelength range of 500 nm to 600 nm include a method in which the half bandwidth of a peak of the reflection ratio at the reflection central wavelength of the light reflection layer formed by fixing a cholesteric liquid crystalline phase which has a reflection central wavelength in a wavelength range of 430 nm to 480 nm is decreased.

The reflection central wavelength, that is, a wavelength at which the peak of the reflection ratio is generated can be adjusted to be a desired value by changing the pitch or refractive index of the light reflection layer formed by fixing a cholesteric liquid crystalline phase, and the change in the pitch can be easily adjusted to be a desired value by changing the amount of a chiral agent added. Specifically, what has been described above is described in detail on pp. 60 to 63 of Fujifilm Research & Development No. 50 (2005).

The method for manufacturing the light reflection layer formed by fixing a cholesteric liquid crystalline phase is not particularly limited, and it is possible to use, for example, the methods described in JP1989-133003A (JP-H1-133003A), JP3416302B, JP3363565B, and JP1996-271731A (JP-H8-271731A), the contents of which are incorporated into the present invention.

Hereinafter, the method described in JP1996-271731A (JP-H8-271731A) will be described.

The cholesteric liquid crystal may be appropriately selected and used and is not particularly limited. A liquid crystal polymer is advantageously used in terms of the superimposition efficiency, thickness reduction, and the like of the liquid crystal layer. In addition, cholesteric liquid crystal molecules preferably have greater birefringence since, then, the wavelength range of selective reflection becomes broad.

As the liquid crystal polymer, for example, an appropriate liquid crystal polymer such as a main chain-type liquid crystal polymer such as a polyester, a side chain-type liquid crystal polymer made of an acrylic main chain, a methacrylic main chain, or a siloxane main chain, a low molecular chiral agent-containing nematic liquid crystal polymer, a chiral component-introduced liquid crystal polymer, or a mixed liquid crystal polymer of a nematic-based liquid crystal polymer and a cholesteric-based liquid crystal polymer can be used. In terms of operability and the like, a liquid crystal polymer having a glass transition temperature in a range of 30° C. to 150° C. is preferred.

The light reflection layer formed by fixing a cholesteric liquid crystalline phase can be formed using an appropriate method such as a method in which the liquid crystal polymer is directly applied to a polarization separating plate through an appropriate alignment film such as a polyimide, a polyvinyl alcohol, or an oblique evaporation layer of SiO as necessary or a method in which the liquid crystal polymer is applied to a support that does not transform at the alignment temperature of the liquid crystal polymer made of a transparent film through an alignment film as necessary. As the support, a support having a small phase difference as possible can be preferably used in terms of preventing a change in the state of polarization. In addition, a method of superimposing light reflection layers formed by fixing a cholesteric liquid crystalline phase through an alignment film or the like can be employed.

Meanwhile, the liquid crystal polymer can be applied using a method in which the liquid crystal polymer turned into a liquid phase such as a solution obtained using a solvent or a molten liquid obtained through heating is developed using an appropriate method such as a roll coating method, a gravure printing method, or a spin coating method. The thickness of the light reflection layer formed by fixing a cholesteric liquid crystalline phase to be formed is preferably in a range of 0.5 μm to 100 μm in terms of preventing selective reflectiveness, disturbed alignment, or a decrease in transmittance.

The film thickness of the light reflection layer formed by fixing a cholesteric liquid crystalline phase is preferably in a range of 3 μm to 12 μm, more preferably in a range of 3 μm to 10 μm, and particularly preferably in a range of 5 μm to 9 μm.

(First λ/4 Plate and Second λ/4 Plate)

The slow axes of the first λ/4 plate and the second λ/4 plate are orthogonal to each other.

With respect to any one of the transmission axis directions in the backlight-side polarizer, it is preferable that the slow axis of the first λ/4 plate is disposed in a 45° direction and the second λ/4 plate is disposed in a 135° direction.

The first λ/4 plate is laminated so that the direction of linearly-polarized light which has passed through the first λ/4 plate becomes parallel to the transmission axis direction of the backlight-side polarizer.

It is preferable that retardations in the first λ/4 plate and the second λ/4 plate in an in-plane direction at the light emission central wavelength of the unpolarized blue light are equal to each other, and the first λ/4 plate and the second λ/4 plate satisfy Expression (1) below.

$$Re(\lambda) = \lambda/4 \pm 10 \text{ nm} \qquad \text{Expression (1)}$$

(In Expression (1), λ represents the light emission central wavelength (unit: nm) of the unpolarized blue light, and Re (λ) represents a retardation (unit: nm) in the in-plane direction at a wavelength of λ nm.)

The λ/4 plate satisfying Expression (1) more preferably satisfies Expression (1') below and particularly preferably satisfies Expression (1") below.

$$Re(\lambda) = \lambda/4 \pm 5 \text{ nm} \qquad \text{Expression (1')}$$

$$Re(\lambda) = \lambda/4 \pm 2 \text{ nm} \qquad \text{Expression (1")}$$

(In Expressions (1') and (1"), λ represents the light emission central wavelength (unit: nm) of the unpolarized blue light, and Re (λ) represents a retardation (unit: nm) in the in-plane direction at a wavelength of λ nm.)

Meanwhile, retardations in the first λ/4 plate and the second λ/4 plate in an in-plane direction at the light emission central wavelength of the unpolarized blue light "being equal to each other" mean not only a case in which retardations are completely equal to each other but also a case in which retardations differ from each other within an optically acceptable range. The difference between the retardations in the first λ/4 plate and the second λ/4 plate in an in-plane direction at the light emission central wavelength of the unpolarized blue light is preferably 20 nm or smaller, more preferably 10 nm or smaller, particularly preferably 5 nm or smaller, and more particularly preferably 2 nm.

Meanwhile, the first λ/4 plate and the second λ/4 plate may or may not exhibit a function as the λ/4 plate in a wavelength range of 500 nm to 600 nm and a wavelength range of 600 nm to 650 nm. However, in the first λ/4 plate and the second λ/4 plate, retardations in an in-plane direction at the light emission central wavelength of green light emitted from the light conversion member are preferably equal to each other, and retardations in an in-plane direction at the light emission central wavelength of red light emitted from the light conversion member are preferably equal to each other. When the first λ/4 plate and the second λ/4 plate have the above-described constitution, changes in the polarization states toward lights in a wavelength range of 500 nm to 600 nm and a wavelength range of 600 nm to 650 nm by the first λ/4 plate and the second λ/4 plate are offset and cancelled.

As the first λ/4 plate and the second λ/4 plate, a plate obtained by disposing two identical λ/4 plates so that the directions of the slow axes are orthogonal to each other is particularly preferably used from the viewpoint of reducing the manufacturing costs and ease of matching the retardations.

A λ/4 plate that can be used as the first λ/4 plate and the second λ/4 plate may have either a narrow bandwidth or a broad bandwidth.

Specifically, the wavelength dispersion of the λ/4 plate may be any one of normal dispersion "Re (450)>Re (550)", flat dispersion "Re (450)≈Re (550)", and reverse dispersion "Re (450)<Re (550)". In a case in which a broad bandwidth λ/4 plate having flat dispersion "Re (450)≈Re (550)" or reverse dispersion "Re (450)<Re (550)" is used, examples of the broad bandwidth λ/4 plate include a plate obtained by combining, as ¼ wavelength plates made of a superimposed body of retardation films, a ¼ wavelength plate in which ½ wavelength of a phase difference is provided with respect to, for example, monochromatic light and a ¼ wavelength plate in which ¼ wavelength of a phase difference is provided and laminating a plurality of retardation films so that optical axes thereof cross each other. As a method for manufacturing the above-described broad bandwidth λ/4 plate, it is possible to use the method described in, for example, JP1996-271731A (JP-H8-271731A), the content of which is incorporated into the present invention.

The λ/4 plate satisfying Expression (1) may be an optical anisotropic support having an intended λ/4 function for itself or may have an optical anisotropic layer or the like on a support made of a polymer film. That is, in the latter case, other layers are laminated on a support, thereby providing a desired λ/4 function to the λ/4 plate. A material constituting the optical anisotropic layer is not particularly limited and may be a layer which is formed of a composition including a liquid crystal compound and exhibits optical anisotropy developed by the alignment of molecules of the liquid crystal compound or a layer having optical anisotropy developed by stretching a polymer film so as to align macromolecules in the film or may have both layers. That is, the optical anisotropic layer can be constituted with one or more biaxial films or can be constituted by combining two or more uniaxial films such as a combination of a C-plate and an A-plate. It is needless to say that the optical anisotropic layer can also be constituted by combining one or more biaxial films and one or more uniaxial films.

A material for the optical anisotropic support used in the present invention is not particularly limited. A variety of polymer films, for example, polyester-based polymers such as cellulose acylate, a polycarbonate-based polymer, polyethylene terephthalate, or polyethylene naphthalate, acrylic polymers such as polymethyl methacrylate, styrene-based polymers such as polystyrene and an acrylonitrile-styrene copolymer (AS resin), and the like can be used. In addition, one or more polymers are selected from polyolefins such as polyethylene and polypropylene, polyolefin-based polymers such as an ethylene-propylene copolymer, amide-based polymers such as vinyl chloride-based polymers, nylon, and an aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, and polymers obtained by mixing polymers, polymer films are produced using the selected polymers as main components, and the polymer films can be used for the production of an optical film in a combined form with which the above-described characteristics are satisfied.

In a case in which the λ/4 plate is a laminate of the polymer film (transparent support) and the optical anisotropic layer, the optical anisotropic layer preferably includes at least one layer formed of a composition including the liquid crystal compound. That is, the λ/4 plate is preferably a laminate of the polymer film (transparent support) and the optical anisotropic layer formed of a composition including the liquid crystal compound. As the transparent support, a polymer film having weak optical anisotropy may be used or a polymer film in which optical anisotropy is developed through a stretching treatment or the like may be used. The light transmittance of the support is preferably 80% or higher.

The kind of the liquid crystal compound used for the formation of the optical anisotropic layer that may be included in the λ/4 plate is not particularly limited. For example, it is also possible to use an optical anisotropic layer obtained by forming a low-molecular-weight liquid crystal compound to be nematic-aligned in a liquid crystal state and then fixing the low-molecular-weight liquid crystal compound through photocrosslinking or thermal crosslinking or an optical anisotropic layer obtained by forming a high-molecular-weight liquid crystal compound to be nematic-aligned in a liquid crystal state and then fixing the alignment by cooling the high-molecular-weight liquid crystal compound. Meanwhile, in the present invention, even in a case in which a liquid crystal compound is used for the optical anisotropic layer, the optical anisotropic layer is a layer formed of the liquid crystal compound being fixed through polymerization or the like, and, once the layer is formed, the optical anisotropic layer does not need to exhibit liquid crystallinity any longer. A polymerizable liquid crystal compound may be a polyfunctional polymerizable liquid crystal compound or a monofunctional polymerizable liquid crystal compound. In addition, the liquid crystal compound may be a discotic liquid crystal compound or a rod-like liquid crystal compound.

Generally, liquid crystal compounds are classified into rod shape-type liquid crystal compounds and disc-type liquid crystal compounds on the basis of the shape of the liquid crystal compound. Furthermore, there are low-molecular-weight liquid crystal compounds and high-molecular-weight liquid crystal compounds, respectively. A high-molecular-weight compound generally refers to a compound having a degree of polymerization of 100 or higher (Polymer Physics and Phase Transition Dynamics, Masao Doi, p. 2, Iwanami Shoten, Publishers, 1992). In the present invention, any liquid crystal compound can be used, but a rod-like liquid crystal compound or a disc-shaped liquid crystal compound is preferably used. Two or more kinds of rod-like liquid crystal compounds, two or more kinds of disc-shaped liquid crystal compounds, or a mixture of a rod-like liquid crystal compound and a disc-shaped liquid crystal compound may be used. Since a change in temperature or a change in humidity can be decreased, the liquid crystal compound is more preferably formed using a rod-like liquid crystal compound or disc-shaped liquid crystal compound having a reactive group, and at least one of the rod-like liquid crystal compound and the disc-shaped liquid crystal compound still more preferably has two or more reactive groups in one liquid crystal molecule. The liquid crystal compound may be a mixture of two or more liquid crystal compounds, and in that case, at least one of the liquid crystal compounds preferably has two or more reactive groups.

As the rod-like liquid crystal compound, for example, the rod-like liquid crystal compound described in JP1999-513019A (JP-H11-513019A) or JP2007-279688A can be preferably used. As the discotic liquid crystal compound, for example, the discotic liquid crystal compound described in JP2007-108732A or JP2010-244038A can be preferably used, but the liquid crystal compound is not limited thereto.

In the optical anisotropic layer, the molecules of the liquid crystal compound are preferably fixed in any alignment state of a homeotropic alignment, a horizontal alignment, a hybrid alignment, and a tilt alignment. In order to produce a phase difference plate in which the view angle reliance is symmetric, the disc surface of the discotic liquid crystal compound is preferably substantially vertical with respect to the film surface (the surface of the optical anisotropic layer) or the long axis of the rod-like liquid crystal compound is preferably substantially horizontal with respect to the film surface (the surface of the optical anisotropic layer). The discotic liquid crystal compound being substantially vertical means that the average value of angles formed between the film surface (the surface of the optical anisotropic layer) and the disc surface of the discotic liquid crystal compound is in a range of 70° to 90°. The average value is more preferably in a range of 80° to 90° and still more preferably in a range of 85° to 90°. The rod-like liquid crystal compound being substantially horizontal means that the angle formed between the film surface (the surface of the optical anisotropic layer) and the director of the rod-like liquid crystal compound is in a range of 0° to 20°. The angle is more preferably in a range of 0° to 10° and still more preferably in a range of 0° to 5°.

In a case in which the λ/4 plate includes the optical anisotropic layer including the liquid crystal compound, the optical anisotropic layer may be made of only a single layer or may be a laminate of two or more layers of the rod-like liquid crystal compound, two or more layers of the disc-shaped liquid crystal compound, or two or more optical anisotropic layers made of a combination of the rod-like liquid crystal compound and the disc-shaped liquid crystal compound.

The optical anisotropic layer can be formed by applying a coating fluid including the liquid crystal compound such as the rod-like liquid crystal compound or the discotic liquid crystal compound and, as desired, a polymerization initiator, an alignment controller, and other additives, which will be described below, onto the support. The optical anisotropic layer is preferably formed by forming an alignment film on the support and applying the coating fluid to the surface of the alignment film.

In the present invention, it is preferable to align the molecules of the liquid crystal compound by applying a composition to the surface of the alignment film. Since the alignment film has a function of regulating the alignment direction of the liquid crystal compound, the alignment film is preferably used for realizing a preferred aspect of the present invention. However, when the liquid crystal compound is aligned, and the alignment state is fixed, the alignment film has already played its role and thus is not an essential constitutional element of the present invention any longer. That is, it is also possible to produce the polarization separating member by transferring only the optical anisotropic layer on the alignment film having a fixed alignment state onto the support.

The alignment film is preferably formed through a rubbing treatment of a polymer.

Examples of the polymer include methacrylate-based copolymers, styrene-based copolymers, polyolefins, polyvinyl alcohols, denatured polyvinyl alcohols, poly(N-methylolacrylamide), polyesters, polyimides, vinyl acetate copolymers, carboxymethyl cellulose, polycarbonate, and the like which are described in Paragraph "0022" in the specification of JP1996-338913A (JP-H8-338913A). A silane coupling agent can be used as the polymer. A water-soluble polymer (for example, poly(N-methylolacrylamide), carboxymethyl cellulose, gelatin, a polyvinyl alcohol, or a denatured polyvinyl alcohol) is preferred, gelatin, a polyvinyl alcohol, or a denatured polyvinyl alcohol is more preferred, and a polyvinyl alcohol or a denatured polyvinyl alcohol is most preferred. As the rubbing treatment, a treatment method which is widely employed as a liquid crystal alignment treatment step of LCD can be applied. That is, it is possible to use a method in which alignment is obtained by rubbing the surface of the alignment film in a certain direction using paper, gauze, felt, rubber, nylon, a polyester fiber, or the like. Generally, the rubbing treatment is carried out by rubbing the surface of the alignment film using a cloth on which fibers having uniform length and size are implanted in an average manner approximately several times.

The molecules of the liquid crystal compound are aligned by applying the composition to the rubbed surface of the alignment film. After that, as necessary, an alignment film polymer and a polyfunctional monomer in the optical anisotropic layer are reacted with each other or the alignment film polymer is crosslinked using a crosslinking agent, whereby the optical anisotropic layer can be formed.

The film thickness of the alignment film is preferably in a range of 0.1 µm to 10 µm.

The in-plane retardation (Re) in a transparent support (polymer film) supporting the optical anisotropic layer is preferably in a range of 0 nm to 50 nm, more preferably in a range of 0 nm to 30 nm, and still more preferably in a range of 0 nm to 10 nm. When the in-plane retardation is within the above-described range, light leak of reflected light can be reduced so as to be invisible, which is preferable.

In addition, the retardation in the thickness direction (Rth) in the support is preferably selected by combining the support with the optical anisotropic layer provided on or below the support. In such a case, light leak of reflected light when observed in a tilt direction and a change in the shade can be reduced.

Examples of the polymer include polyolefins such as a cellulose acylate film (for example, a cellulose triacetate film (refractive index: 1.48), a cellulose diacetate film, a cellulose acetate butyrate film, or a cellulose acetate propionate film), polyethylene, and polypropylene, polyester-based resin films such as polyethylene terephthalate and polyethylene naphthalate, polyacrylic resin films such as a polyether sulfone film and a polymethyl methacrylate, polyurethane-based resin films, polyester films, polycarbonate films, polysulfone films, polyether films, polymethyl pentene films, polyether ketone films, (meth)acrylonitrile films, polyolefins, polymers having an alicyclic structure (a norbornene-based resin (ARTON: trade name, manufactured by JSR Corporation) or amorphous polyolefin (ZEONEX: trade name, manufactured by ZEON Corporation)), and the like. Among these, triacetyl cellulose, polyethylene terephthalate, and the polymers having an alicyclic structure are preferred, and triacetyl cellulose is particularly preferred.

The thickness of the transparent support can be in a range of approximately 10 µm to 200 µm, but is preferably in a range of approximately 10 µm to 80 µm, and more preferably in a range of approximately 20 µm to 60 µm. In addition, the transparent support may be formed by laminating a plurality of layers. While a thin thickness is preferred for suppression of external light reflection, a thickness of smaller than 10 µm weakens the strength of the film, which is not preferable. In order to improve adhesiveness between the transparent support and layers provided on the transparent support (an adhesive layer, a homeotropic alignment film, or a phase difference layer), a surface treatment (for example, a glow discharge treatment, a corona discharge treatment, an ultraviolet (UV) treatment, or a flame treatment) may be carried out on the transparent support. An adhesive layer (undercoat layer) may be provided on the transparent support. In addition, as the transparent support or a long transparent support, a support formed by applying a polymer layer into which inorganic particles having an average particle diameter in a range of approximately 10 nm to 100 nm are mixed in a solid content weight ratio of 5% to 40% to one side of the support or by co-casting the polymer layer and the support is preferably used in order to impart slidability in a transportation step or prevent the rear surface and the front surface from being attached to each other after winding.

Meanwhile, in the above description, the $\lambda/4$ plate having the laminate structure in which the optical anisotropic layer is provided on the support has been described, but the present invention is not limited to this aspect, and the $\lambda/4$ plate may be laminated on one surface of one transparent support. Furthermore, the $\lambda/4$ plate may be formed of a stretched polymer film (optical anisotropic support) alone or a liquid crystal film formed of a composition including the liquid crystal compound alone. The preferred example of the liquid crystal film is also identical to the preferred example of the optical anisotropic layer.

The $\lambda/4$ plate is preferably continuously manufactured in a state of a long film. At this time, the slow axis angle of the $\lambda/4$ plate is preferably $45°\pm8°$ or $135°\pm8°$ with respect to the longitudinal direction of the long film. In such a case, in the manufacturing of an optical laminate described below, it becomes possible to match the longitudinal direction of the long film and the longitudinal direction of a polarizer and attach the long film and the polarizer together using a roll-to-roll method, and it becomes possible to manufacture a circular polarizing plate or an ellipsoidal polarizing plate having high accuracy in terms of the axis angle of attachment and high productivity. Meanwhile, in a case in which the optical anisotropic layer is formed of the liquid crystal compound, the angle of the slow axis of the optical anisotropic layer can be adjusted to be a desired value by means of the angle of rubbing. In addition, in a case in which the $\lambda/4$ plate is formed of a stretched polymer film (optical anisotropic support), the angle of the slow axis can be adjusted to be a desired value depending on the stretching direction.

(Method for Attaching Polarization Separating Member)

In the liquid-crystal display device of the present invention, the polarization separating member and the backlight-side polarizer are preferably disposed adjacent to each other directly or through an adhesive layer.

In addition, in the polarization separating member, the first λ/4 plate, the light reflection layer formed by fixing a cholesteric liquid crystalline phase, and the second λ/4 plate are preferably laminated in this order in direct contact with each other or through an adhesive layer.

When the members are integrated together, it is possible to prevent poor display caused by the thickness reduction of the members, a decrease in the interface reflection loss at an air layer in a gap between the members, and the entering of a foreign substance between the members which is likely to occur during or after the manufacturing of the liquid-crystal display device.

As the method for attaching the members together, a well-known method can be used. The polarization separating member is preferably formed by transferring the light reflection layer formed by fixing a cholesteric liquid crystalline phase, which is provided on a temporary support, onto the first λ/4 plate or the second λ/4 plate so as to be laminated and peeling the temporary support off as necessary. In addition, a roll-to-panel method can also be used and is preferred since productivity and yield are improved. The roll-to-panel method is described in JP2011-48381A, JP2009-175653A, JP4628488B, JP4729647B, WO2012/014602A, WO2012/014571, and the like, but the roll-to-panel method is not limited thereto.

Examples of a method for laminating the members in direct contact with each other include a method in which each member is laminated by being applied to another member.

In addition, an adhesive layer (adhesive layer) may be disposed between the members.

The adhesive layer refers to, for example, a substance in which the ratio (tan δ=G"/G') of the storage modulus of elasticity G' to the loss modulus of elasticity G" which are measured using a dynamic viscoelasticity measurement instrument is in a range of 0.001 to 1.5, and examples thereof include adhesives, substances that easily creep, and the like. Examples of the adhesive that can be used in the present invention include acrylic adhesives and polyvinyl alcohol-based adhesives, but the adhesive is not limited thereto.

Examples of an adhesive that can be used in the adhesive layer include resins such as polyester-based resins, epoxy-based resins, polyurethane-based resins, silicone-based resins, and acrylic resins. These adhesives may be used singly or in a mixed form of two or more adhesives. Particularly, acrylic resins are preferred since the acrylic resins have excellent reliability in terms of water resistance, heat resistance, and light resistance and have a favorable adhesive force and favorable transparency, and furthermore, the refractive index is easily adjusted to be suitable for liquid-crystal display. Examples of the acrylic adhesives include acrylic acid and esters thereof, methacrylic acid and esters thereof, homopolymers of acryl monomers such as acrylamide or acrylonitrile or copolymers thereof, and furthermore, copolymers of at least one acryl monomer and an aromatic vinyl monomer such as vinyl acetate, maleic anhydride, or styrene. Particularly, an adhesive which is a copolymer made up of a main polymer such as ethylene acrylate, butyl acrylate, or 2-ethylhexyl acrylate, which develops adhesiveness, a monomer such as vinyl acetate, acrylonitrile, acrylamide, styrene, methacrylate, or methyl acrylate, which serves as an aggregation force component, and furthermore, a functional group-containing monomer such as methacrylic acid, acrylic acid, itaconic acid, hydroxyethyl methacrylate, hydroxypropyl methacrylate, dimethylamino ethyl methacrylate, acrylamide, methylolacryl amide, glycidyl methacrylate, or maleic anhydride, which improves the adhesive force or imparts a crosslinking origination, has a glass transition temperature (Tg) in a range of −60° C. to −15° C., and has a weight-average molecular weight in a range of 200,000 to 1,000,000 is preferred.

As a curing agent, for example, a metal chelate-based crosslinking agent, an isocyanate-based crosslinking agent, an epoxy-based crosslinking agent, or a mixture of one or two or more thereof can be used as necessary. The acrylic adhesive is practically preferably formulated into in a state of including a filler described below so that the adhesive force falls into a range of 100 g/25 mm to 2000 g/25 mm. When the adhesive force is smaller than 100 g/25 mm, environment resistance is poor, particularly, there is a concern that peeling may occur at a high temperature and a high humidity. Conversely, when the adhesive force is greater than 2000 g/25 mm, there is a problem in that attachment correction is not possible or, even if possible, the adhesive remains. The refractive index (the B method according to JIS K-7142) of the acrylic adhesive is in a range of 1.45 to 1.70 and particularly preferably in a range of 1.5 to 1.65.

The adhesive includes a filler in order to adjust the refractive index to be a desired value. Examples of the filler include inorganic white pigments such as silica, calcium carbonate, aluminum hydroxide, magnesium hydroxide, clay, talc, and titanium dioxide, organic transparent or white pigments such as an acrylic resin, a polystyrene resin, a polyethylene resin, an epoxy resin, and a silicone resin, and the like. An acrylic adhesive is preferably selected since silicon beads or epoxy resin beads have excellent dispersibility with respect to the acrylic adhesive, and a uniform and favorable refractive index can be obtained. In addition, the filler is preferably a spherical filler in which light uniformly diffuses.

The particle diameter (JIS B9921) of the filler is desirably in a range of 0.1 μm to 20.0 μm and preferably in a range of 1.0 μm to 10.0 μm.

The refractive index (the B method according to JIS K-7142) of the filler preferably has a difference from the refractive index of the adhesive in a range of 0.05 to 0.5 and more preferably in a range of 0.05 to 0.3.

The content of the filler in a diffusion adhesive layer is in a range of 1.0% by mass to 40.0% by mass and particularly desirably in a range of 3.0% by mass to 20% by mass.

<Backlight-side Polarizing Plate and Display-side Polarizing Plate>

Next, the backlight-side polarizing plate and the display-side polarizing plate will be described.

The polarizing plate included in the liquid-crystal display device of the present invention preferably includes a polarizer and a polarizing plate protective film disposed on either surface of the polarizer and is more preferably made up of a polarizer and two polarizing plate protective films disposed on both sides of the polarizer (hereinafter, also referred to as protective films). As the polarizing plate protective film on the outer side of the backlight-side polarizing plate, the polarization separating member may be used, and a polarizing plate protective film on the inner side of the backlight-side polarizing plate may not be used. In a case in which the polarization separating member is not used as the polarizing plate protective film on the outer side of the backlight-side polarizing plate and the polarization separating member is used as a member independent from the polarization protective film, in the present invention, in order to further reduce the thickness thereof, the thickness of the protective film is preferably further reduced (60 µm or smaller, preferably 40 µm or smaller, and more preferably 25 µm or smaller). A hard coat obtained by applying, drying, and curing a protective resin such as an acrylic resin (having a thickness of 20 µm or smaller, preferably 10 µm or smaller, and more preferably 5 µm or smaller) is more preferably used.

A polarizer not provided with a protective layer is more preferably used for realizing the additional reduction of thickness.

In the present invention, as the polarizing plate protective film on the inner side disposed on the liquid crystal cell side out of the two polarizing plate protective films, in the case of the liquid-crystal display device in a VA, IPS, TN, or OCB mode, a retardation film is more preferably used, in the case of the liquid-crystal display device in an IPS mode, an optical compensation film barely having a phase difference is preferably used, and the polarizing plate protective film on the inner side is preferably not used for realizing the additional reduction of thickness.

(Polarizer)

As the polarizer, a polarizer obtained by adsorbing and aligning iodine in a polymer film is preferably used. The polymer film is not particularly limited, and a variety of polymer films can be used. Examples thereof include hydrophilic macromolecular films such as a polyvinyl alcohol-based film, a polyethylene terephthalate-based film, an ethylene/vinyl acetate copolymer-based film, films obtained by partially saponifying the above-described film, and a cellulose-based film, polyene-based alignment films such as a dehydrated substance of a polyvinyl alcohol and a dechlorinated substance of a polyvinyl chloride. Among these, a polyvinyl alcohol-based film having an excellent dyeing affinity due to iodine as a polarizer is preferably used.

As a material for the polyvinyl alcohol-based film, a polyvinyl alcohol or a derivative thereof is used. Examples of the derivative of a polyvinyl alcohol include polyvinyl formal, polyvinyl acetal, and furthermore, polyvinyl formal and polyvinyl acetal which are denatured using an olefin such as ethylene or propylene, a unsaturated carboxylic acid such as acrylic acid, methacrylic acid, or crotonic acid, an alkyl ester or acrylamide thereof, or the like.

The degree of polymerization of the polymer which is a material for the polymer film is generally in a range of 500 to 10,000, preferably in a range of 1000 to 6000, and more preferably in a range of 1400 to 4000. Furthermore, in the case of a saponified film, the degree of saponification is, for example, preferably 75% by mol or higher, more preferably 98% by mol or higher, and still more preferably in a range of 98.3% by mol to 99.8% by mol in terms of solubility in water.

The polymer film (un-stretched film) is subjected to at least a uniaxial stretching treatment and a iodine dyeing treatment according to an ordinary method. Furthermore, it is possible to carry out a boric acid treatment and a cleansing treatment on the polymer film. In addition, the polymer film that has been subjected to the above-described treatments (stretched film) is dried according to an ordinary method, thereby turning into a polarizer.

A stretching method in the uniaxial stretching treatment is not particularly limited, and any of a wet stretching method and a dry stretching method can be employed. Examples of stretching means for the dry stretching method include an inter-roll stretching method, a heating roll stretching method, a compression stretching method, and the like. The polymer film can be stretched in multiple stages. In the stretching means, the un-stretched film is generally turned into a heated state. The stretching ratio of the stretched film can be appropriately set according to the purpose, and the stretching ratio (total stretching ratio) is desirably set in a range of approximately 2 times to 8 times, preferably set in a range of 3 times to 7 times, and more preferably set in a range of 3.5 times to 6.5 times.

The iodine dyeing treatment is carried out by, for example, immersing the polymer film in an iodine solution including iodine and potassium iodide. The iodine solution is generally an aqueous solution of iodine and includes iodine and potassium iodide as a solution aid. The concentration of iodine is in a range of approximately 0.01% by mass to 1% by mass and preferably in a range of 0.02% by mass to 0.5% by mass. The concentration of potassium iodide is in a range of approximately 0.01% by mass to 10% by mass and, furthermore, preferably in a range of 0.02% by mass to 8% by mass.

In the iodine dyeing treatment, the temperature of the iodine solution is generally in a range of approximately 20° C. to 50° C. and preferably generally in a range of 25° C. to 40° C. The immersion duration is generally in a range of approximately 10 seconds to 300 seconds and preferably in a range of 20 seconds to 240 seconds. In the iodine dyeing treatment, the content of iodine and the content of potassium in the polymer film are adjusted to fall into the above-described ranges by adjusting the conditions such as the concentration of the iodine solution and the immersion temperature and immersion duration of the polymer film in the iodine solution to be desired values. The iodine dyeing treatment may be carried out in any stage of before the uniaxial stretching treatment, during the uniaxial stretching treatment, and after the uniaxial stretching treatment.

When optical characteristics are taken into account, the content of iodine in the polarizer is, for example, in a range of 2% by mass to 5% by mass and preferably in a range of 2% by mass to 4% by mass.

The polarizer preferably includes potassium. The content of potassium is preferably in a range of 0.2% by mass to 0.9% by mass and more preferably in a range of 0.5% by mass to 0.8% by mass. When the polarizer includes potassium, the polarizer has a preferred complex modulus of elasticity (Er), and a polarization film having a high degree of polarization can be obtained. Potassium can be added to the polarizer by, for example, immersing the polymer film, which is a material for forming the polarizer, in a solution including potassium. This solution may also serve as the solution including iodine.

As the drying treatment step, a well-known drying method in the related art such as natural drying, blowing drying, or heating drying can be used. For example, in heating drying, the heating temperature is in a range of approximately 20° C. to 80° C., and the drying duration is in a range of approximately 1 minute to 10 minutes. In addition, the polymer film can be appropriate stretched in the drying treatment step as well.

The thickness of the polarizer is not particularly limited, but is generally in a range of 1 µm to 100 µm, preferably in a range of 3 µm to 30 µm, and more preferably in a range of 5 µm to 20 µm.

Regarding the optical characteristics of the polarizer, when measured using a polarizer single body, the single body transmittance is preferably 43% or higher and more preferably in a range of 43.3% to 45.0%. In addition, the orthogonal transmittance, which is measured by preparing two polarizers and superimposing the polarizers so that the absorption axes of the two polarizers form 90°, is preferably smaller, practically, preferably in a range of 0.00% to 0.050%, and more preferably 0.030% or smaller. The degree of polarization is, practically, preferably in a range of 99.90% to 100% and particularly preferably in a range of 99.93% to 100%. The polarizer is preferably capable of producing almost the same optical characteristics as what have been described above even when the optical characteristics are measured as the polarizing plate as well.

(Polarizing Plate Protective Film)

Among protective films, as the protective film disposed on a side opposite to the liquid crystal cell, a thermoplastic resin having excellent transparency, mechanical strength, thermal stability, moisture-shielding properties, isotropy, and the like is used. Specific examples of the thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (norbornene-based resin), a polyarylate resin, a polystyrene resin, a polyvinyl alcohol resin, and mixtures thereof.

Particularly, in the liquid-crystal display device of the present invention, the backlight-side polarizing plate includes a polarizer and two polarization protective films disposed on both surfaces of the polarizer, and, in a case in which the polarization separating member is not used as the polarizing plate protective film on the outer side of the backlight-side polarizing plate, at least the polarizing plate protective film on the polarization separating member side (the side opposite to the liquid crystal cell) out of the two polarizing plate protective films is preferably a cellulose acylate film.

The cellulose resin is an ester of cellulose and an aliphatic acid. Specific examples of the cellulose ester-based resin include triacetyl cellulose, diacetyl cellulose, tripropyl cellulose, dipropyl cellulose, and the like. Among these, triacetyl cellulose is particularly preferred. A number of products of triacetyl cellulose are commercially available, and thus triacetyl cellulose is advantageous in terms of ease of procurement and costs as well. Examples of the commercially available product of triacetyl cellulose include "UV-50", "UV-80", "SH-80", "TD-80U", "TD-TAC", and "UZ-TAC" trade names manufactured by Fujifilm Corporation, "KC series" manufactured by Konica Corporation, and the like.

Specific example of the cyclic polyolefin resin is preferably a norbornene-based resin. A cyclic olefin-based resin is a collective term for resins polymerized using a cyclic olefin as a polymerization unit, and examples thereof include the resins described in JP1989-240517A (JP-H1-240517A), JP1991-14882A (JP-H3-14882A), JP1991-122137A (JP-H3-122137A), and the like. Specific examples thereof include open-ring (co)polymers of cyclic olefins, addition polymers of cyclic olefins, copolymers of a cyclic olefin and an α-olefin such as ethylene or propylene (typically, a random copolymer), graft polymers obtained by denaturing the above-described resin using unsaturated carboxylic acid or a derivative thereof, hydrogenated substances thereof, and the like. Specific examples of the cyclic olefin include norbornene-based monomers.

As the cyclic polyolefin resin, a variety of products are commercially available. Specific examples thereof include "ZEONEX", "ZEONOA" trade names manufactured by ZEON Corporation, "ARTON" trade name manufactured by JSR Corporation, "TOPAS" trade name manufactured by Celanese Corporation, and "APEL" trade name manufactured by Mitsui Chemicals, Inc.

As the (meth)acrylic resin, an arbitrary appropriate (meth)acrylic resin can be employed as long as the effects of the present invention are not impaired. Examples thereof include poly(meth)acrylic acid esters such as methyl polymethacrylate, methyl methacrylate-(meth)acrylic acid copolymers, methyl methacrylate-(meth)acrylic acid ester copolymers, methyl methacrylate-acrylic acid ester-(meth)acrylic acid copolymer, methyl (meth)acrylate-styrene copolymers (MS resins and the like), and polymers having an alicyclic hydrocarbon group (for example, methyl methacrylate-cyclohexyl methacrylate copolymer, methyl methacrylate-(meth)acrylic acid norbornyl copolymer, and the like). Preferred examples thereof include C1-6 alkyl poly(meth)acrylate such as methyl poly(meth)acrylate, and more preferred examples thereof include methyl methacrylate-based resins including methyl methacrylate as a main component (50% by mass to 100% by mass and preferably 70% by mass to 100% by mass).

Specific examples of the (meth)acrylic resin include ACRYPET VH and ACRYPET VRL20A manufactured by Mitsubishi Rayon Co., Ltd., the (meth)acrylic resin having a ring structure in the molecule described in JP2004-70296A, and the (meth)acrylic resin having a high Tg which is obtained through intramolecular crosslinking or an intramolecular cyclization reaction.

As the (meth)acrylic resin, it is also possible to use a (meth)acrylic resin having a lactone ring structure. This is because the (meth)acrylic resin has high heat resistance, high transparency, and high mechanical strength when being biaxial-stretched.

The thickness of the protective film can be appropriately set and is generally in a range of approximately 1 μm to 500 μm in terms of strength, operability such as handling, and thin layer properties. Particularly, the thickness thereof is preferably in a range of 1 μm to 300 μm and more preferably in a range of 5 μm to 200 μm. The thickness of the protective film is particularly suitably in a range of 5 μm to 150 μm.

Re (λ) and Rth (λ) respectively represent the in-plane retardation and the retardation in the thickness direction at a wavelength λ. Re (λ) is measured by introducing light having a wavelength of λ nm in the film normal direction in a KOBRA 21ADH or WR (manufactured by Oji Scientific Instruments Co., Ltd.). When selecting the measurement wavelength of λ nm, it is possible to measure the retardations by manually exchanging wavelength selective filters or converting a measurement value using a program or the like. In a case in which a film to be measured is expressed as a uniaxial or biaxial index ellipsoid, Rth (λ) is computed using the following method. Meanwhile, a part of this measurement method is also used for the measurement of the average tilt angle on the alignment film side of a discotic liquid crystal compound molecule in an optical anisotropic layer described below and an average tilt angle on the side opposite thereto.

Rth (λ) is computed as described below. Re (λ) is measured at a total of six points by introducing light having a wavelength of λ nm in directions tilted at 10 degree intervals from the normal direction to the film, which is determined using the in-plane slow axis (determined using KOBRA 21ADH or WR) as a tilt axis (rotational axis) (in a case in which there is no slow axis, an arbitrary direction in the film is used as the rotational axis), through 50° toward a single side, and Rth (λ) is computed on the basis of the measured retardation values, an assumed average refractive index, and the input film thickness value using KOBRA 21AD or WR. In the above description, in the case of a film having a direction in which the retardation value reaches zero at a certain tilt angle from the normal direction determined using the in-plane slow axis as the rotational axis, the retardation value at a tilt angle larger than the above-described tilt angle is changed into a negative value and then is computed using KOBRA 21ADH or WR. Meanwhile, Rth (λ) can also be computed as described below. Retardation values are measured in two arbitrary tilt directions using the slow axis as a tilt axis (rotational axis) (in a case in which there is no slow axis, an arbitrary direction in the film is used as the rotational axis), and Rth is computed on the basis of the above-described values, an assumed average refractive index, and the input film thickness value using Expressions (A) and (B) below.

$$Re(\theta) = \left[ nx - \frac{(ny \times nz)}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$

Expression (A)

Meanwhile, the Re (θ) represents a retardation value in a direction tilted at an angle θ from the normal direction. In addition, in Expression (A), nx represents the refractive index in the slow axis direction in the plane, ny represents the refractive index in a direction orthogonal to nx in the plane, and nz represents the refractive index in a direction orthogonal to nx and ny. d represents the film thickness.

$$Rth = ((nx+ny)/2 - nz) \times d$$

Expression (B)

In a case in which a film to be measured cannot be expressed as a uniaxial or biaxial index ellipsoid, that is, does not have any optic axis, Rth (λ) is computed using the following method. Re (λ) is measured at a total of 11 points by introducing light having a wavelength of λ nm in directions tilted at 10 degree intervals from −50° to +50° with respect to the normal direction to the film, which is determined using the in-plane slow axis (determined using KOBRA 21ADH or WR) as a tilt axis (rotational axis), and Rth (λ) is computed on the basis of the measured retardation values, an assumed average refractive index, and the input film thickness value using KOBRA 21AD or WR. In the above measurement, as the assumed average refractive index, values from a polymer handbook (JOIN WILEY & SONS, INC) and a variety of optical film catalogues can be used. For optical films having unknown average refractive index values, the refractive index values can be measured using an Abbe refractometer. The average refractive index values of the major optical films will be described below: cellulose acylate (1.48), cycloolefin polymer (1.52), polycarbonate (1.59), polymethyl methacrylate (1.49), and polystyrene (1.59). When these assumed average refractive index values and the film thickness are input, KOBRA 21ADH or WR computes nx, ny, and nz. Nz is further computed using the computed nx, ny, and nz from an equation Nz=(nx−nz)/(nx−ny).

Meanwhile, in the present specification, "visible light" refers to light having a wavelength in a range of 380 nm to 780 nm. In addition, in the present specification, the measurement wavelength is 550 nm unless particularly specified.

In addition, in the present specification, angles (for example, angles such as "90°") and relationships therebetween (for example, "orthogonal", "parallel", "crossing at 45°", and the like) do not necessarily need to be exact as long as the margin of error is within an acceptable range in the technical field to which the present invention belongs. For example, a specific angle means an angle in a range of the specific angle±10°, and the margin of error from the specific angle is preferably 5° or lower and more preferably 3° or lower.

In the present specification, the "slow axis" in the retardation film or the like refers to a direction in which the refractive index becomes greatest.

In addition, in the present specification, numeric values, numeric ranges, and qualitative expressions (for example, expressions such as "identical" and "equivalent") indicating the optical characteristics of the respective members such as a phase difference region, the retardation film, and the liquid crystal layer are interpreted to include numeric values, numeric ranges, and properties having a margin of error within a range generally acceptable in the liquid-crystal display device and the members used therein.

In addition, in the present specification, "front surface" refers to the normal direction to the display surface, "front surface contrast (CR)" refers to the contrast computed from white luminance and black luminance measured in the normal direction to the display surface, and "view angle contrast (CR)" refers to the contrast computed from white luminance and black luminance measured in a tilt direction tilted from the normal direction to the display surface (for example, a direction defined as 60 degrees in the polar angle direction with respect to the display surface).

(Adhesive Layer)

For attachment between the polarizer and the protective film, it is possible to appropriately employ an adhesive or the like depending on the polarizer and the protective film. The adhesive and an adhesion treatment method are not particularly limited, and, for example, the polarizer and the protective film can be attached together using an adhesive made of a vinyl polymer, an adhesive made of at least a water-soluble crosslinking agent of a vinyl alcohol-based polymer such as boric acid, borax, glutaraldehyde, melamine, or oxalic acid. The adhesive layer made of the above-described adhesive can be formed in a form of an applied and dried layer of an aqueous solution or the like, and, in preparation of the aqueous solution, it is possible to formulate a crosslinking agent, other additives, and a catalyst such as an acid as necessary. Particularly, in a case in which a polyvinyl alcohol-based polymer film is used as the polarizer, an adhesive including a polyvinyl alcohol-based resin is preferably used in terms of adhesiveness. Furthermore, an adhesive including a polyvinyl alcohol-based resin having an acetoacetyl group is more preferred in terms of improving durability.

The polyvinyl alcohol-based resin is not particularly limited, but a polyvinyl alcohol-based resin having an average degree of polarization in a range of approximately 100 to 3000 and an average degree of saponification in a range of approximately 85% by mol to 100% by mol is preferred in terms of adhesiveness. In addition, the concentration of the adhesive aqueous solution is not particularly limited, but is preferably in a range of 0.1% by mass to 15% by mass and more preferably in a range of 0.5% by mass to 10% by mass. The thickness of the dried adhesive layer is preferably in a range of approximately 30 nm to 1000 nm and more preferably in a range of 50 nm to 300 nm. When the thickness is too thin, the adhesive force becomes insufficient, and, when the thickness is too thick, there is a high possibility that a problem may be caused in terms of appearance.

As additional examples of the adhesive, it is possible to use a thermosetting resin or an ultraviolet-curable resin such as a (meth)acrylic resin, an urethane-based resin, an acrylurethane-based resin, an epoxy-based resin, or a silicone-based resin.

<Liquid Crystal Cell>

The constitution of the liquid crystal cell is not particularly limited, and it is possible to employ a liquid crystal cell having an ordinary constitution. The liquid crystal cell includes, for example, a pair of substrates disposed opposite to each other and a liquid crystal layer sandwiched between a pair of the substrates and may include a color filter layer or the like as necessary. The driving mode of the liquid crystal cell is also not particularly limited, and it is possible to use a variety of modes such as twisted nematic (TN), super twisted nematic (STN), vertical alignment (VA), in-plane switching (IPS), and optically compensated bend cell (OCB).

The liquid crystal cell used in the liquid-crystal display device of the present invention is preferably a VA-mode liquid crystal cell, an OCB-mode liquid crystal cell, an IPS-mode liquid crystal cell, or a TN-mode liquid crystal cell, but is not limited thereto.

In the TN-mode liquid crystal cell, when no voltage is applied thereto, rod-like liquid crystal molecules are substantially horizontally aligned and, furthermore, are aligned in a twisted manner at 60° to 120°. The TN-mode liquid crystal cell is most frequently used as a color TFT liquid-crystal display device and is described in a number of publications.

In the VA-mode liquid crystal cell, when no voltage is applied thereto, rod-like liquid crystal molecules are substantially vertically aligned. Examples of the VA-mode liquid crystal cell include not only (1) a narrowly-defined VA-mode liquid crystal cell in which rod-like liquid crystal molecules are substantially vertically aligned when no voltage is applied thereto and substantially horizontally aligned when a voltage is applied thereto (described in JP1990-176625A (JP-H2-176625A)) but also (2) a (MVA-mode) liquid crystal cell obtained by forming multi-domains in the VA-mode liquid crystal cell in order to expand the view angle (described on p. 845 in SID97, Digest of tech. Papers (proceedings) 28 (1997)), (3) a liquid crystal cell having a mode in which rod-like liquid crystal molecules are substantially vertically aligned when no voltage is applied thereto and are twisted and multi-domain-aligned when a voltage is applied thereto (n-ASM mode) (described in Proceedings 58 and 59 (1998) of Japanese Liquid Crystal Conference), and (4) a SURVIVAL-mode liquid crystal cell (disclosed in LCD International 98). In addition, the VA-mode liquid crystal cell may be any one of a patterned vertical alignment (PVA)-type liquid crystal cell, an optical alignment-type liquid crystal cell, and a polymer-sustained alignment (PSA) liquid crystal cell. Details of the above-described modes are described in detail in JP2006-215326A and JP2008-538819A.

In the IPS-mode liquid crystal cell, rod-like liquid crystal molecules are aligned substantially parallel to the substrate, and the liquid crystal molecules respond in a planar manner when a planar electric field is applied to the substrate surface. The IPS-mode liquid crystal cell displays black when no electric field is applied thereto, and the absorption axes of a pair of top and bottom polarizing plates are orthogonal to each other. A method for improving a view angle by reducing leakage of light occurring when the liquid crystal cell displays black in a tilt direction using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), JP1998-307291A (JP-H10-307291A), and the like.

An embodiment of the liquid-crystal display device is preferably constituted by including a liquid crystal cell in which a liquid crystal layer is sandwiched between facing substrates at least one of which is provided with an electrode and disposing the liquid crystal cell between two polarizing plates. The liquid-crystal display device includes a liquid crystal cell in which liquid crystals are sealed between top and bottom substrates and displays an image by applying a voltage thereto so as to change the alignment state of the liquid crystals. Furthermore, the liquid-crystal display device includes functional layers accompanying a polarization plate protective film, an optical compensation member performing optical compensation, and an adhesive layer as necessary.

<Other Members>

In addition, the liquid-crystal display device of the present invention may include other members. For example, surface layers such as a forward scattering layer, a primer layer, an antistatic layer, and an undercoat layer may be disposed together with (or in place of) a color filter substrate, a thin film transistor substrate, a lens film, a diffusion sheet, a hard coat layer, an antireflection layer, a low reflection layer, an antiglare layer, and the like.

(Color Filter)

Regarding pixels in the present invention, in a case in which visible light B having a wavelength of 500 nm or shorter is used as a light source, as a method for forming RGB pixels, a variety of well-known methods can be used. For example, it is possible to form a desired black matrix and R, G, (and B pixel patterns on a glass substrate using a photomask and a photoresist or to form a black matrix having a desired width using R, G, and B pixel-coloring inks and eject an ink composition using an inkjet-type printing device into a region partitioned by black matrixes which has a width larger than that of the above-described black matrix provided every n pixels (a concave section surrounded by convex sections) until a desired concentration thereof is reached, thereby producing a color filter made up of R, G, and B patterns. After the image is colored, individual pixels and the black matrixes may be completely cured through baking or the like.

Preferred characteristics of the color filter are described in JP2008-083611A, the content of which is incorporated into the present invention.

For example, in a color filter exhibiting green, one of the wavelengths at which the transmittance reaches half the maximum transmittance is preferably in a range of 590 nm to 610 nm, and the other is preferably in a range of 470 nm to 500 nm. In addition, in a color filter exhibiting green, one of the wavelengths at which the transmittance reaches half the maximum transmittance is preferably in a range of 590 nm to 600 nm. Furthermore, in a color filter exhibiting green, the maximum transmittance is preferably 80% or higher. In a color filter exhibiting green, the wavelengths at which the transmittance reaches the maximum is preferably in a range of 530 nm to 560 nm.

In the light source included in a light source unit, the wavelength of a light emission peak in a wavelength range of 600 nm to 700 nm is preferably in a range of 620 nm to 650 nm. The light source included in the light source unit has a light emission peak in a wavelength range of 600 nm to 700 nm, and, in a color filter exhibiting green, the transmittance at the wavelength of the light emission peak is preferably 10% or lower of the maximum transmittance.

In a color filter exhibiting red, the transmittance in a range of 580 nm to 590 nm is preferably 10% or lower of the maximum transmittance.

As pigments for the color filter, C. I. Pigment Blue 15:6 and, as a complementary pigment, C. I. Pigment Violet 23 are used for blue, C. I. Pigment Red 254 and, as a complementary pigment, C. I. Pigment Yellow 139 are used for red. As green pigments, generally, C. I. Pigment Green 36 (copper phthalocyanine bromide green), C. I. Pigment Green 7 (copper phthalocyanine chloride green), as complementary pigments, C. I. Pigment Yellow 150, C. I. Pigment Yellow 138, and the like are used. The half value wavelength can be controlled by adjusting the composition of these pigments. The half value wavelength on the long wavelength side can be set in a range of 590 nm to 600 nm by increasing the amount of the composition of the complementary pigments little by little with respect to a comparative example. Meanwhile, currently, pigments are generally used, but dyes may be used for the color filter as long as the dyes are colorants capable of controlling the spectroscope and of ensuring process stability and reliability.

(Black Matrix)

In the liquid-crystal display device of the present invention, a black matrix is disposed between individual pixels. Examples of a material forming the black stripe include a sputtered film of a metal such as chromium, a light-shielding photosensitive composition obtained by combining a photosensitive resin or a black coloring agent, and the like. Specific examples of the black coloring agent include carbon black, titanium carbon, iron oxide, titanium oxide, graphite, and the like, and, among these, carbon black is preferred.

(Thin Film Transistor)

The liquid-crystal display device of the present invention preferably further includes a TFT substrate including a thin film transistor (hereinafter, also referred to as TFT).

The thin film transistor preferably includes an oxide semiconductor layer having a carrier concentration of lower than $1 \times 10^{14}/cm^3$. A preferred aspect of the thin film transistor is described in JP2011-141522A, the content of which is incorporated into the present invention.

EXAMPLES

Hereinafter, characteristics of the present invention will be more specifically described using examples and comparative examples. Materials, used amounts, proportions, processing contents, processing orders, and the like described in the following examples can be appropriately altered within the purport of the present invention. Therefore, the scope of the present invention should not be limitedly interpreted by specific examples described below.

Example 1

<Manufacturing of Polarization Separating Member>
(Formation of First λ/4 Plate)

With reference to JP2012-108471A, a first λ/4 plate (B narrowband λ/4 plate) was formed on a commercially available cellulose acylate-based film "TD60" (manufactured by Fujifilm Corporation) using a discotic liquid crystal compound.

The obtained first λ/4 plate had a Re (450) of 112 nm, a Re (550) of 93 nm, and a film thickness of 2.2 μm.

(Formation of Light Reflection Layer Formed by Fixing Cholesteric Liquid Crystalline Phase)

With reference to pp. 60 to 63 of Fujifilm Research & Development No. 50 (2005), a light reflection layer formed by fixing a cholesteric liquid crystalline phase was formed by means of coating on a support by changing the added amount of a chiral agent used.

The obtained light reflection layer formed by fixing a cholesteric liquid crystalline phase had a reflection central wavelength of the peak of the maximum reflection ratio of 445 nm, a half width of 70 nm, a film thickness of 2.5 μm, a Δn of liquid crystal of 0.12, and an average refractive index of 1.57. In addition, in a case in which a light reflection layer having a Δn of liquid crystal of 0.17 was used, a reflection central wavelength of 450 nm, a half width of 100 nm, and a film thickness of 2.5 μm could be realized.

Only the light reflection layer formed by fixing a cholesteric liquid crystalline phase, which had been formed above, was peeled off from the support and was transferred onto the first λ/4 plate.

(Formation of Second λ/4 Plate)

With reference to JP2012-108471A, a second λ/4 plate (B narrowband λ/4 plate) was prepared on a commercially available cellulose acylate-based film "TD60" (manufactured by Fujifilm Corporation) using a discotic liquid crystal compound.

The obtained second λ/4 plate had a Re (450) of 112 nm, a Re (550) of 93 nm, and a film thickness of 2.2 μm.

Only the second λ/4 plate for which the discotic liquid crystal compound was used, which had been formed above, was peeled off from the support and was transferred onto the light reflection layer formed by fixing a cholesteric liquid crystalline phase, which had been prepared above.

A polarization separating member including the obtained first λ/4 plate, the obtained light reflection layer formed by fixing a cholesteric liquid crystalline phase, and the obtained second λ/4 plate was used as a polarization separating film 1. The total thickness of the polarization separating film 1 was 7 μm.

<Preparation of Polarizing Plate 1>

As a front-side polarizing plate protective film of a backlight-side polarizing plate, a commercially available cellulose acylate-based film "TD60" (manufactured by Fujifilm Corporation) was used.

As a rear-side polarizing plate protective film of the backlight-side polarizing plate, a film obtained by laminating the polarization separating film 1 on a cellulose acylate-based film "TD60" (manufactured by Fujifilm Corporation) was used.

A polarizer was manufactured in the same manner as described in "0219" and "0220" of JP2006-293275A, and the above-described two polarizing plate protective films were attached to both surfaces of the polarizer, thereby manufacturing a polarizing plate 1.

<Formation of Light Conversion Member>

As a light conversion member, with reference to U.S. Pat. No. 7,303,628B, dissertation (Peng, X. G; Manna, L.; Yang, W. D.; Wickham, j.; Scher, E.; Kadavanich, A.; Alivisatos, A. P. Nature 2000, 404, 59 to 61), and a dissertation (Manna, L.; Scher, E. C.; Alivisatos, A. P. j. Am. Chem. Soc. 2000, 122, 12700 to 12706), a quantum rod 1 which emitted green fluorescent light having a central wavelength of 540 nm and a half width of 40 nm and a quantum rod 2 which emitted red fluorescent light having a central wavelength of 645 nm and a half width of 30 nm when blue light from a blue light-emitting diode entered the rods were formed. The shapes of the quantum rods 1 and 2 were rectangular parallelepiped shapes, and the average of the lengths of the long axes of the quantum rods was 30 nm. Meanwhile, the average of the lengths of the long axes of the quantum rods was confirmed using a transmission electron microscope.

Next, a quantum rod sheet 1 in which the quantum rods were dispersed was produced using the following method.

As a base material, a sheet of isophthalic acid-copolymerized polyethylene terephthalate copolymerized with 6 mol % of isophthalic acid (hereinafter, refer to "amorphous PET") was produced. The glass transition temperature of the amorphous PET is 75° C. A laminate made up of the amorphous PET base material and a quantum rod-aligned layer was produced as described below. Here, the quantum rod-aligned layer includes the produced quantum rods 1 and 2 using a polyvinyl alcohol (hereinafter, refer to "PVA") as a matrix. That is, the glass transition temperature of PVA is 80° C.

A quantum rod-containing PVA aqueous solution was prepared by dissolving PVA powder having a degree of polymerization of 1000 or higher, a degree of saponification of 99% or higher (at a concentration of 4% to 5%) and the quantum rods 1 and 2 produced above (at a concentration of 1% respectively) in water. In addition, a 200 μm-thick amorphous PET base material was prepared. Next, the quantum rod-containing PVA aqueous solution was applied to the 200 μm-thick amorphous PET base material and was dried at a temperature in a range of 50° C. to 60° C., thereby forming a 25 μm-thick quantum rod-containing PVA layer on the amorphous PET base material. A laminate of the amorphous PET and the quantum rod-containing PVA will be called a quantum rod sheet 1.

Next, the produced quantum rod sheet 1 was put into a stretching apparatus disposed in an oven set to a stretching temperature environment of 130° C., and the free end was uniaxially stretched so that the stretching ratio reached three times. Due to this stretching treatment, in the quantum rod-containing PVA layer in the stretched laminate, PVA molecules were aligned, and accordingly, the quantum rod-containing PVA layer was changed to a 15 μm-thick quantum rod-containing PVA layer in which the quantum rods were aligned. This quantum rod-containing PVA layer will be called a quantum rod-aligned sheet 1. Meanwhile, the long-axis alignment state of the quantum rod was confirmed using a transmission electron microscope.

The obtained quantum rod-aligned sheet 1 and the polarizing plate 1 manufactured in Manufacturing Example 1 were attached together using an acrylic adhesive having a refractive index of 1.47.

<Manufacturing of Liquid-crystal Display Device>

A commercially available liquid-crystal display device (manufactured by Panasonic Corporation, trade name: TH-L42D2) was disassembled, the backlight-side polarizing plate was changed to the polarizing plate 1 including the polarization separating film 1 disposed on the rear side, which had been manufactured above, the quantum rod-aligned sheet 1 manufactured above was disposed between the polarization separating film 1 and a backlight unit, and the backlight unit was changed to the following B narrowband backlight unit, thereby manufacturing a liquid-crystal display device of Example 1.

The B narrowband backlight unit used includes a blue light-emitting diode (Nichia B-LED: Royal Blue, main wavelength of 445 nm, a half width of 20 nm, hereinafter, also referred to as B light source) as a light source. In addition, the B narrowband backlight unit includes a reflection member which reflects light emitted from the light source and reflected by an optical sheet member in a rear portion of the light source.

Example 2

With reference to JP2009-199001A, a prism sheet was manufactured.

A liquid-crystal display device of Example 2 was manufactured in the same manner as in Example 1 except for the fact that, in Example 1, the prism sheet manufactured above was disposed between the polarization separating film 1 and the quantum rod-aligned sheet 1.

Reference Example 1

A commercially available liquid-crystal display device (manufactured by Panasonic Corporation, trade name: TH-L42D2) was disassembled, the polarizing plate 1 manufactured in Manufacturing Example 1 was used as the backlight-side polarizing plate, and a dielectric multilayer film (RGB) (trade name: DBEF, manufactured by 3M Company, a film thickness of 25 μm) was separated without providing an adhesive layer and was disposed between the backlight-side polarizing plate and the backlight unit, thereby manufacturing a liquid-crystal display device of Reference Example 1.

The dielectric multilayer film (RGB) had an almost constant flat peak of the reflection ratio with respect to wavelengths in the blue to green to red region of 450 nm to 550 nm to 630 nm.

Meanwhile, a white backlight light source (hereinafter, also referred to as W light source) in the liquid-crystal display device had a light emission peak wavelength of blue light at 450 nm.

Comparative Example 1

A B narrowband monochromatic dielectric multilayer film (B) prepared using the following method was attached to the polarizing plate 1 manufactured in Manufacturing Example 1 using the same adhesive as in Example 1.

The total thickness of the B narrowband monochromatic dielectric multilayer film (B) was changed as shown in Table 1 below with reference to IDW/AD' 12, pp. 985 to 988 (2012), and the B narrowband monochromatic dielectric multilayer film was manufactured so that the reflection central wavelength of the peak of the maximum reflection ratio in a wavelength range corresponding to blue light reached 465 nm and the half width reached 30 nm.

A liquid-crystal display device of Comparative Example 1 was manufactured in the same manner as in Example 1 except for the fact that, in the manufacturing of the liquid-crystal display device of Example 1, a laminate of the polarizing plate 1 and the monochromatic dielectric multilayer film (B) manufactured above was used instead of the laminate of the polarizing plate 1 and the polarization separating film 1.

Comparative Example 2

A liquid-crystal display device of Comparative Example 2 was manufactured in the same manner as in Example 1 except for the fact that, in the manufacturing of the liquid-crystal display device of Example 1, the polarizing plate 1 manufactured above was used instead of the laminate of the polarizing plate 1 and the polarization separating film 1.

[Evaluation]

The liquid-crystal display devices of the respective examples, reference examples, and comparative examples were evaluated according to the following standards.

(Front Surface Luminance)

The front surface luminance (white luminance) of the liquid-crystal display device was measured using the method described in "0180" of JP2009-93166A. The results are shown in Table 1 below.

(Color Reproduction Region)

The color reproduction region (NTSC ratio) of the liquid-crystal display device was measured using the method described in "0066" of JP2012-3073A. The results are shown in Table 1 below.

5: polarization separating member
11: luminance-improving film
12a: first λ/4 plate
12b: second λ/4 plate
14: layer formed by fixing cholesteric liquid crystalline phase
16: light conversion member (converting blue light to green light and red light)
17: fluorescent material
31: backlight unit
31A: blue light source
31B: light guide plate
32: unpolarized blue light (incident light from backlight unit)
33: blue transmitted light (linearly-polarized blue light transmitted through polarization separating member)

TABLE 1

| | | Example 1 | Example 2 | Reference Example 1 | Comparative Example 1 | Comparative Example 2 |
|---|---|---|---|---|---|---|
| Constitution | Display-side polarizing plate | Polarizing plate in commercially available LCD | Polarizing plate in commercially available LCD | Polarizing plate in commercially available LCD | Polarizing plate in commercially available LCD | Polarizing plate in commercially available LCD |
| | Liquid crystal cell | Liquid crystal cell in commercially available LCD | Liquid crystal cell in commercially available LCD | Liquid crystal cell in commercially available LCD | Liquid crystal cell in commercially available LCD | Liquid crystal cell in commercially available LCD |
| | Backlight-side polarizing plate | Polarizing plate 1 | Polarizing plate 1 | Polarizing plate 1 | Polarizing plate 1 | Polarizing plate 1 |
| | Polarization separating member or reflection-type polarization film — Type | Polarization separating film 1 | Polarization separating film 1 | Dielectric multilayer film (RGB) | Dielectric multilayer film (B) | None |
| | Thickness [μm] | 7 | 7 | 25 | 10 | 0 |
| | Luminance-improving film | None | Prism sheet | None (served by dielectric multilayer film) | None (served by dielectric multilayer film) | None |
| | Light conversion member | Quantum rod-aligned sheet 1 | Quantum rod-aligned sheet 1 | None | Quantum rod-aligned sheet 1 | Quantum rod-aligned sheet 1 |
| | Light source in backlight unit | B light source | B light source | W light source | B light source | B light source |
| Evaluation | Front surface luminance | 220 | 230 | 210 | 120 | 120 |
| | Color reproduction region NTSC ratio [%] | 100 | 100 | 70 | 100 | 100 |

From Table 1, it was found that the liquid-crystal display device of the present invention was improved in terms of the front surface luminance and the color reproduction region. Meanwhile, it was found that the front surface luminance and the color reproduction region could be improved using members having a reduced thickness with a smaller number of members than in the constitution of Reference Example 1 in which a well-known white light source of the related art and DBEF as the polarization separating member were used.

Meanwhile, from Comparative Example 1, it was found that, in a case in which the B narrowband dielectric multilayer film was used instead of the polarization separating member satisfying the constitution of the present invention, the front surface luminance was low.

From Comparative Example 2, it was found that, in a case in which the polarization separating member satisfying the constitution of the present invention was not used, the front surface luminance was low.

EXPLANATION OF REFERENCES

1: backlight-side polarizing plate
2: polarizing plate protective film (inner side)
3: backlight-side polarizer
4: polarizing plate protective film (outer side)
34: blue reflected light (linearly-polarized blue light reflected by polarization separating member)
35: green light (linearly-polarized green light emitted from light conversion member)
36: red light (linearly-polarized red light emitted from light conversion member)
42: liquid crystal cell
44: display-side polarizing plate
45: polarizing plate protective film (outer side)
46: polarizer
47: polarizing plate protective film (inner side)
51: liquid-crystal display device

What is claimed is:

1. A liquid-crystal display device comprising:
a backlight unit, a light conversion member, a polarization separating member, a backlight-side polarizer, a liquid crystal cell, and a display-side polarizing plate, which are disposed in this order,
wherein the backlight unit includes a light source that emits unpolarized blue light having a light emission central wavelength in a wavelength range of 430 nm to 480 nm,
wherein the polarization separating member separates the unpolarized blue light entering in a normal direction to the polarization separating member into blue transmitted light and blue reflected light which are linearly polarized in vibration directions that are orthogonal to each other, transmits at least some of light in a wavelength range of 500 nm to 600 nm, and transmits at least some of light in a wavelength range of 600 nm to 650 nm, wherein the light conversion member includes a fluorescent material that, due to blue light entering the light conversion member, emits green light which has a light emission central wavelength in a wavelength range of 500 nm to 600 nm and is linearly-polarized light and red light which has a light emission central wavelength in a wavelength range of 600 nm to 650 nm and is linearly-polarized light, wherein a transmission axis of the backlight-side polarizer is parallel to vibration directions of the green light and the red light, wherein the polarization separating member includes a first λ/4 plate, a light reflection layer formed by fixing a cholesteric liquid crystalline phase, and a second λ/4 plate in this order, wherein the light reflection layer formed by fixing a cholesteric liquid crystalline phase has a reflection central wavelength in a wavelength range of 430 nm to 480 nm, reflects one of right-circularly-polarized light and left-circularly-polarized light at the reflection central wavelength, transmits the other, transmits at least some of light in a wavelength range of 500 nm to 600 nm, and transmits at least some of light in a wavelength range of 600 nm to 650 nm, wherein slow axes of the first λ/4 plate and the second λ/4 plate are orthogonal to each other, wherein retardations in the first λ/4 plate and the second λ/4 plate in an in-plane direction at the light emission central wavelength of the unpolarized blue light are equal to each other, and wherein the first λ/4 plate and the second λ/4 plate satisfy Expression (1) below:

$$Re(\lambda) = \lambda/4 \pm 10 \text{ nm}, \quad \text{Expression (1)}$$

in Expression (1), λ represents the light emission central wavelength (unit: nm) of the unpolarized blue light, and Re (λ) represents a retardation (unit: nm) in the in-plane direction at a wavelength of λ nm.

2. The liquid-crystal display device according to claim 1, wherein the fluorescent material includes at least a quantum dot.

3. The liquid-crystal display device according to claim 2, wherein the quantum dot is a quantum rod having an ellipsoid shape or a rectangular parallelepiped shape.

4. The liquid-crystal display device according to claim 3, wherein a long-axis direction of the quantum rod is aligned in a direction parallel to the transmission axis of the backlight-side polarizer.

5. The liquid-crystal display device according to claim 2, wherein
a light emission central wavelength of unpolarized blue light emitted from the backlight unit is in a wavelength range of 440 nm to 460 nm,
a reflection central wavelength of the light reflection layer formed by fixing a cholesteric liquid crystalline phase is in a wavelength range of 440 nm to 460 nm, and
the light emission central wavelength of the unpolarized blue light emitted from the backlight unit and the reflection central wavelength of the light reflection layer formed by fixing the cholesteric liquid crystalline phase coincide with each other.

6. The liquid-crystal display device according to claim 1, wherein both the green light and the red light emitted from the light conversion member has a peak with a light emission intensity a half bandwidth of which is 100 nm or smaller.

7. The liquid-crystal display device according to claim 1, wherein the entire backlight unit is a surface light source.

8. The liquid-crystal display device according to claim 1, wherein a light emission central wavelength of unpolarized blue light emitted from the backlight unit is in a wavelength range of 440 nm to 460 nm,
a reflection central wavelength of the light reflection layer formed by fixing a cholesteric liquid crystalline phase is in a wavelength range of 440 nm to 460 nm, and
the light emission central wavelength of the unpolarized blue light emitted from the backlight unit and the reflection central wavelength of the light reflection layer formed by fixing the cholesteric liquid crystalline phase coincide with each other.

9. The liquid-crystal display device according to claim 1, wherein the unpolarized blue light emitted from the backlight unit has a peak with a light emission intensity a half bandwidth of which is 30 nm or smaller.

10. The liquid-crystal display device according to claim 1, wherein the polarization separating member and the backlight-side polarizer are disposed adjacent to each other directly or through an adhesive layer.

11. The liquid-crystal display device according to claim 1, comprising:
two polarizing plate protective films disposed on both surfaces of the backlight-side polarizer, and
wherein at least the polarizing plate protective film on a polarization separating member side out of the two polarizing plate protective films is a cellulose acylate film.

12. The liquid-crystal display device according to claim 1, wherein a luminance-improving film is further disposed.

13. The liquid-crystal display device according to claim 1, wherein the backlight unit includes a reflection member.

* * * * *